United States Patent [19]

Wober et al.

[11] Patent Number: 5,740,284
[45] Date of Patent: Apr. 14, 1998

[54] CODING METHOD AND APPARATUS FOR RESAMPLING AND FILTERING IMAGES USING DISCRETE COSINE TRANSFORMS

[75] Inventors: Munib A. Wober, Haverhill; Michael L. Reisch, Carlisle, both of Mass.

[73] Assignee: Polaroid Corporation, Cambridge, Mass.

[21] Appl. No.: 427,457

[22] Filed: May 18, 1995

Related U.S. Application Data

[63] Continuation of Ser. No. 159,795, Nov. 30, 1993, abandoned.

[51] Int. Cl.$^6$ .............................. G06K 9/03; H04N 1/415
[52] U.S. Cl. ............................................ 382/250; 358/432
[58] Field of Search ........................... 382/250, 248; 358/426, 432

[56] References Cited

U.S. PATENT DOCUMENTS

| | | | |
|---|---|---|---|
| 5,028,995 | 7/1991 | Izawa et al. | 358/105 |
| 5,168,375 | 12/1992 | Reisch et al. | 358/432 |
| 5,216,516 | 6/1993 | Tanaka et al. | 358/426 |
| 5,227,875 | 7/1993 | Suu et al. | 358/133 |
| 5,253,078 | 10/1993 | Balkanski et al. | 358/426 |

FOREIGN PATENT DOCUMENTS

| | | | |
|---|---|---|---|
| 2211691 | 5/1989 | United Kingdom | H04N 7/133 |

OTHER PUBLICATIONS

Stephen A. Martucci; "Convolution–Multiplication Properties For The Entire Family Of Discrete Sine And Cosine Transforms"; *Proc. Twenty–sixth Annual Conference on Information Sciences and Systems;* (Princeton, N.J.), pp. 399–404, Mar. 1992.

"Scale Factor of Resolution Conversion Based on Orthogonal Transforms" by Muramatsu et al., IEICE Trans. Fundamentals, vol. E76-A, No. 7 Jul. 1993.

Chan, Shing-Chow and Ho, Ka-Leung, "Fast Odd Sinusoidal Transform Algorithms," IEEE, 1991, pp. 1014–1017.

"Compatible HDTV Coding for Broadband ISDN" by Tzou et al. (1988), pp. 743–749.

"Discrete Cosine Transform Filtering" by Chitprasert & Rao (1990), pp. 233–245.

"Symmetric Convolution and the Discrete Sine and Cosine Transforms: Principles and Applications" by Stephen A. Martucci, May 1993.

"Image Enhancement Using Cosine Transform Filtering" by Chen & Fralick (Nov. 1976), pp. 186–192.

"Experiments on Two–Dimensional Decimation in Time and Orthogonal Transform Domains" by Ngan (1986), pp. 249–263.

"Block Operations in Digital Signal Processing with Application to TV Coding" by Adant et al. (1987), pp. 385–397.

*Primary Examiner*—Jose L. Couso
*Assistant Examiner*—Matthew C. Bella
*Attorney, Agent, or Firm*—Robert A. Sabourin

[57] ABSTRACT

Image processing methods and apparatus by which images in the spatial domain can be represented in the frequency domain through the use of discrete cosine transforms, conveniently operated on to achieve scaling and filtering effects while in the frequency domain, and then retransformed to the spatial domain or stored, displayed, reproduced or transmitted to distant locations for subsequent reuse. The scaling techniques which the invention utilizes can be for image enlargement by interpolation or image reduction by decimation. In the case of decimation, a filtering operation preferably is first performed in the frequency domain to avoid artifacts in the decimation process. The filtering operation is mathematically equivalent to a linear convolution in the spatial domain as a consequence of the properties of the DCT transformation. In both interpolation and decimation procedures, use is made of a hybrid inverse discrete cosine transform in which the series of cosine terms are evaluated at values arrived at by scaling ratio considerations, rather than the usual sampling index increments. As a consequence, image data points other than original image data in the spatial domain can be created or replaced by an approximation technique which involves transforming the image data points to frequency space by a series of terms that can be considered to be continuous over the range of the sampling index corresponding to the original image data.

32 Claims, 9 Drawing Sheets

CODING METHOD AND APPARATUS FOR RESAMPLING AND FILTERING IMAGES USING DISCRETE COSINE TRANSFORMS

RELATED APPLICATIONS

This application is related to U.S. Pat. No. 5,168,375. Furthermore, this application is a continuation of application Ser. No. 08/159,795 filed by the same inventors on Nov. 30, 1993, now abandoned.

BACKGROUND OF THE INVENTION

1. Field of the Invention

This invention relates generally to improved methods and apparatus for image processing. More particularly, the invention relates to novel methods and apparatus for using discrete cosine transformations to: enlarge an image by interpolation; reduce an image by decimation; and/or filter an image in the frequency domain by a method equivalent to a mathematical convolution in the spatial domain.

2. Description of the Prior Art

Images can be thought of as two-dimensional representations of some visual reality that is distributed in space and/or time. Ordinarily, they are what the human visual system perceives as variations in external stimuli such as brightness, color, and sometimes depth cues. Over the years many techniques have been developed to capture and reproduce images, such as representing images as continuous, discrete, or digital signals which can be manipulated, processed or displayed through the use of computers or other special purpose electronic hardware in electronic form, images can be enhanced to create special visual effects, restored, coded for transmission to distant locations, reconstructed, displayed, or converted to some other tangible form.

Processing an electronic image may include such operations as filtering, sharpening, smoothing, compressing, de, compressing, enlarging, reconstructing, and printing the image, or any portion thereof, in various image processing systems such as an electronic camera, camcorder, printer, computer or any other imaging device.

Image processing can occur in either the spatial domain or the frequency domain. An image is said to reside in the spatial domain when the values of the parameters used to describe it, such as brightness, have a direct correspondence with spatial location. In the frequency domain, the image in the spatial domain may be represented by a series of frequency components in the form of trigonometric functions which, when summed for each image data point (i.e., pixel) yield the value of the parameter used to characterize the image of that point in the spatial domain, and such a representation may be extended to cover all points of an image.

In the spatial domain, original image data may be conveniently represented as image data points in a first spatial matrix designated, s(j,i), for a two-dimensional case where the lower case, s, designates the spatial domain, i is the index of rows and j is the index of columns. In the frequency domain, matrices can also be used to mathematically describe an image as a set of the transform coefficients (also referred to as frequency coefficients) which represent frequency data in a transform matrix conventionally designated, S(v,u), where the upper case, S, designates the frequency domain and, u is the index of rows and v is the index of columns.

Spatial image data points may be transformed to frequency space using transformations such as Fourier transforms or discrete cosine transforms (DCTs). When the transformation involved is a discrete cosine transformation, the frequency domain is referred to as the DCT domain and the frequency coefficients are referred to as DCT coefficients. Conventionally, transforming data from the spatial domain to the frequency domain is referred to as a forward transformation, whereas transforming data from the frequency domain to the spatial domain is referred to as an inverse transformation. Hence, a forward discrete cosine transformation is defined as a transform that maps an image from the original image data points s(j,i) in the spatial domain to DCT coefficients S(v,u) in the DCT domain according to the basis function of the forward DCT, whereas an inverse discrete cosine transformation (or IDCT) is defined as a transform that maps the DCT coefficients S(v,u) from the DCT domain to reconstructed image data points s'(j,i) in the spatial domain according to the basis function of the IDCT.

The use of DCT and IDCT transforms for compressing or decompressing images to reduce memory storage requirements and/or increase transfer and computational speeds is well-known and, in fact, the practice has been adopted as standard in industry by such groups as The Joint Photographic Experts Group (JPEG), which was created as part of a joint effort of the Consultative Committee on International Telegraphy and Telephony (CCITT) and The International Standards Organization (ISO). Today, most image processing programs support both loading and saving files that conform to JPEG standards for files or formats, and there is even custom hardware on the market for compressing and decompressing in JPEG format.

Even so, the application of DCT transforms to image processing operations other than compression is not well-known and offers an opportunity to conveniently utilize available custom hardware or general purpose computers to achieve other processing effects such as scaling, filtering, or the conditioning of image data for efficient transmission while suppressing or reducing artifacts.

Consequently, it is a primary object of this invention to provide methods and apparatus which utilize discrete cosine transforms for image processing operations other than compression.

It is another object of the present invention to provide methods and apparatus which utilize discrete cosine transforms for enhancing compression while reducing artifacts.

Other objects of the invention will, in part, appear hereinafter and, in part, be obvious when the following detailed description is read in conjunction with the drawings.

SUMMARY OF THE INVENTION

Image processing methods and apparatus include ways in which images in the spatial domain can be represented in the frequency domain through the use of discrete cosine transforms, conveniently operated on to achieve scaling and filtering effects while in the frequency domain, and then retransformed to the spatial domain or stored, displayed, reproduced or transmitted to distant locations for subsequent reuse.

The scaling techniques which the invention utilizes can be for image enlargement by interpolation or image reduction by decimation. In the case of decimation, a filtering operation preferably is first performed in the frequency domain to avoid artifacts in the decimation process. The filtering operation is mathematically equivalent to a linear convolution in the spatial domain as a consequence of the properties of the DCT transformation.

In both interpolation and decimation procedures, use is made of a hybrid inverse discrete cosine transform in which the hybrid inverse cosine basis function is determined from the series of cosine terms, evaluated at values arrived at by scaling, i.e. resampling, ratio considerations rather than the usual sampling index increments. As a consequence, image data points other than those comprising original image data in the spatial domain can be generated by an approximation technique which involves representing the image in frequency space by a series of frequency coefficients that can be considered to be continuous over the range of the sampling index of the original image data.

In use, the hybrid technique involves first transforming spatial image data to frequency space through the use of a standard DCT. Here, a DCT basis matrix, and its transpose for the two-dimensional case, are matrix product multiplied by the image data in matrix form to generate a matrix of DCT coefficients. A scaling ratio is chosen and a hybrid IDCT basis matrix is generated along with its transpose. The results of these two operations are mathematically combined to generate a reconstructed image data matrix through an inverse transform step. The reconstructed image data matrix represents the new image which may be either enlarged or reduced in size.

The scaling operations can be carried out so that the magnification is the same along orthogonal azimuths or different along both since the operations can be mathematically decoupled by reason of the orthogonal property of the DCT basis functions.

To perform the filtering operation for sharpening or smoothing, use is made of a discrete odd cosine transform of a symmetric filtering kernel in the spatial domain. When decimating, the filtering operation is preferably performed to avoid artifacts and adjacent image data matrices are preferably overlapped by at least one row and column.

All operations are preferably performed in JPEG format and special purpose hardware adapted to the JPEG standard may also be beneficially employed to process image data in 8×8 or 16×16 sized blocks.

BRIEF DESCRIPTION OF THE DRAWINGS

The aforementioned aspects and other features of the invention are described in detail in conjunction with the accompanying drawings in which the same reference numerals are used throughout for denoting corresponding elements and wherein.

DETAILED DESCRIPTION OF THE PREFERRED EMBODIMENTS

This invention relates generally to improved methods and apparatus for image processing. More particularly, the invention relates to novel methods and apparatus for using discrete cosine transformations to: enlarge an image by interpolation; reduce an image by decimation; and/or filter an image in the frequency domain by a method equivalent to a mathematical convolution in the spatial domain.

The following mathematical discussion, in part, sets forth certain fundamentals relating to forward and inverse discrete cosine transforms (DCTs).

A forward DCT is defined as a mathematical process for transforming image data points from the spatial domain to the frequency or, more particularly, DCT domain. Image data points $s(i)$ in one dimensional form may be transformed from the spatial domain to DCT coefficients $S(u)$ for the frequency domain according to equation (1).

$$S(u) = C_u \sqrt{\frac{2}{N}} \sum_{i=0}^{N-1} s(i) \cos \frac{(2i+1)u\pi}{2N} \qquad (1)$$

for $0 \leq u \leq (N-1)$, where:

$S(u)$ represents the DCT coefficients;

$s(i)$ represents the image data point;

N represents the number of image data points;

$$C_u = \frac{1}{\sqrt{2}}$$

for $u=0$; and $C_u = 1$ for $u \neq 0$.

Figure 1:
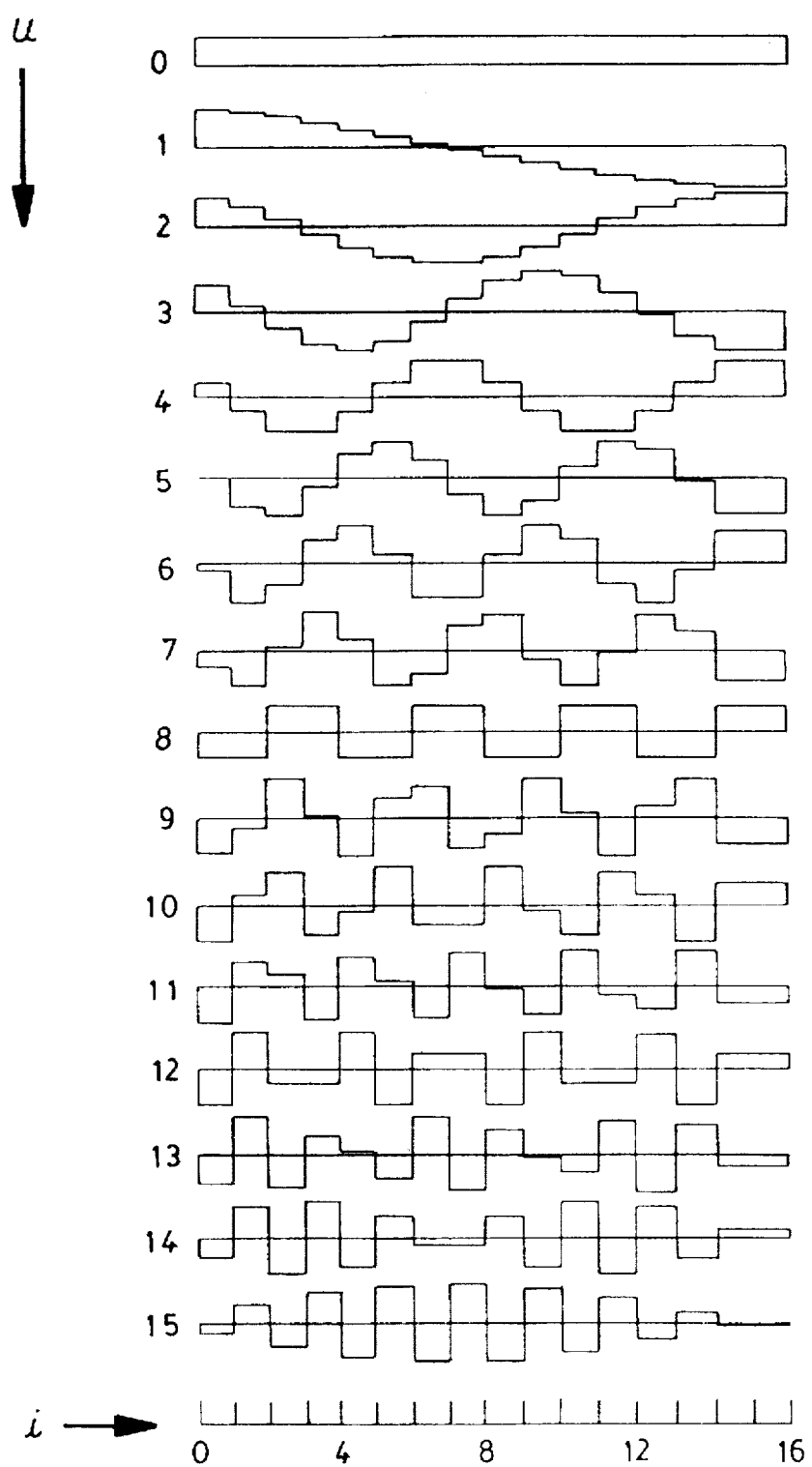
FIG. 1 is a plot of discrete cosine normalized basis functions for the one dimensional case of a DCT as given by equation (1)

The DCT coefficients $S(u)$ are derived from equation (1) where the cosine normalized basis terms are shown in FIG. 1 for N=16, where $0 \leq u \leq 15$ and $0 \leq i \leq 15$. The value for $S(0)$ is determined for u=0 by summing each of the image data points $s(i)$ for $0 \leq i \leq (N-1)$ times the cosine terms as represented in FIG. 1. The value for $S(1)$ is determined as the summation of image data points $s(i)$ times the cosine terms for u=1. This procedure, which indexes first on u and then on i, is continued to derive all sixteen DCT coefficients $S(0)$ through $S(15)$.

The various terms of equation (1) can alternatively be expressed in matrix notation, where each cosine term represents an element of a one dimensional matrix defined as a forward DCT basis matrix FB, each image data point represents an element of a first spatial matrix $s(i)$ of image data points, and each DCT coefficient represents an element of a DCT matrix $S(u)$ of DCT coefficients.

An inverse discrete cosine transformation is defined as a mathematical process for transforming DCT coefficients from the DCT domain to reconstructed image data points in the spatial domain. DCT coefficients S(u) in one dimensional form are transformed from the DCT domain to reconstructed image data points s'(i) in the spatial domain according to equation (2).

$$s'(i) = \sqrt{\frac{2}{N}} \sum_{u=0}^{N-1} C_u S(u) \cos \frac{(2i+1)u\pi}{2N} \quad (2)$$

for $0 \leq i \leq (N-1)$, where:

S(u) represents the DCT coefficients;

s'(i) represents the reconstructed image data points;

N represents the number of DCT coefficients;

$$C_u = \frac{1}{\sqrt{2}}$$

for u=0; and $C_u=1$ for u≠0.

If the DCT coefficients S(u) of equation (1) are derived from a set of image data points s(i), and the reconstructed image data points s'(i) of equation (2) are derived from the corresponding DCT coefficients S(u), then s(i)≡s'(i) and the process is referred to as lossless since the reconstructed image data points s'(i) are identical to the original image data points s(i), within limits. The reconstructed image data points s'(i) are derived from equation (2) where the cosine terms are shown in FIG. 1 for N=16, where $0 \leq i \leq 15$ and $0 \leq u \leq 15$. The value for s'(0) is determined for i=0 by summing each of the DCT coefficients S(u) times the cosine terms as represented in FIG. 1. The value for s'(1) is determined as the summation of DCT coefficients S(u) times the cosine terms for i=1. This procedure is continued, indexed as before, to derive all sixteen reconstructed image data points s'(0) through s'(15).

Note that the conventional inverse DCT of equation (2) for transforming data in one dimensional form includes the same cosine argument resulting in the same basis function used in the conventional forward DCT of equation (1) so that the reconstructed image data points s'(i) coincide with the original image data points s(i). However, there is no recognition in the prior art for one to use the IDCT for determining reconstructed image data points s'(i) that fall between the original image data points s(i) in the spatial domain.

The above examples for a one dimensional DCT and IDCT can be extended, as known by those skilled in the art, to multi-dimensional formats. For instance, Section A.3.3 of ISO/IEC 10918-1 of the draft international standards for digital compression using discrete cosine transforms defines the forward DCT in two dimensional form as:

$$S(v,u) = \frac{1}{4} C_u C_v \sum_{i=0}^{7} \sum_{j=0}^{7} s(j,i) \cos \frac{(2i+1)u\pi}{16} \cos \frac{(2j+1)v\pi}{16} \quad (3)$$

for $0 \leq u \leq 7$ and $0 \leq v \leq 7$, while defining the IDCT in two dimensional form as:

$$s'(j,i) = \frac{1}{4} \sum_{u=0}^{7} \sum_{v=0}^{7} C_u C_v S(v,u) \cos \frac{(2i+1)u\pi}{16} \cos \frac{(2j+1)v\pi}{16} \quad (4)$$

for $0 \leq i \leq 7$ and $0 \leq j \leq 7$, where

S(v,u) represents DCT coefficients;

s(j,i) represents original image data points;

s'(j,i) represents the reconstructed image data points;

$$C_u = \frac{1}{\sqrt{2}}$$

for u=0;

$C_u=1$ for u≠0;

$$C_v = \frac{1}{\sqrt{2}}$$

for v=0; and $C_v=1$ for v≠0.

According to equation (3), a first spatial matrix s(j,i) (representing a two dimensional 8×8 group of original image data points in the spatial domain) can be forward DCT transformed to an 8×8 DCT matrix S(v,u) in the frequency domain having 64 DCT coefficients that can be related to the 64 image data points through mapping. An 8×8 forward DCT basis matrix, i.e. forward transform matrix, is derived from the cosine expression of equation (3) by indexing over the full range of values for j, i, v and u.

Once the image data points s(j,i) are transformed into DCT coefficients S(v,u) in the DCT domain, the number of DCT coefficients can be reduced by compression which is defined, generally, as the process of reducing either the bandwidth or the number of bits necessary to represent an image and, more specifically, as the process of decreasing the number of DCT coefficients S(v,u) in the DCT domain by removing a selected set of the DCT coefficients. The selected set are determined to be non-essential to image reproduction according to some predetermined criteria. Typically, the set of DCT coefficients selected for removal includes zero or near zero values or those terms which represent high frequency content that the human visual system cannot perceive thus no necessary information is lost.

Another aspect of image processing in the DCT domain is sharpening anal smoothing an image by a filtering procedure mathematically equivalent to a convolution in the spatial domain. A convolution of two discrete signals in the spatial domain occurs by multiplying the two discrete signals point-by-point then summing the products over appropriate limits. Sharpening is defined as the process of enhancing blurry images, particularly by emphasizing high frequency components representing edges in an image. Smoothing, on the other hand, is defined as the process for either softening the edges of the image or alternatively decreasing high frequency components.

Filtering an image in the DCT domain using a process similar to a mathematical convolution in the spatial domain is disclosed in an article entitled "Discrete Cosine Transform Filtering" by Chitprasert & Rao, Signal Processing 19(1990) pgs. 233–245, where a kernel is processed through a 2N point discrete Fourier transform (DFT) yielding 2N complex numbers. A kernel is defined as the signal values of a filter to perform a specific operation such as sharpening or smoothing in the spatial or frequency domain. The imaginary parts of the 2N complex numbers are determined, then discarded, while the real and even parts of the 2N complex numbers are retained for further calculations. Determination of the imaginary parts of the complex numbers requires computational time and effort even though the imaginary parts are not required for filtering the image. However, this filtering process is computationally intensive and, as will be seen, its requirement for use of complex numbers will be overcome by the invention.

Resampling

According to the invention, images may be scaled utilizing hybrid procedures based on, but advantageously different from, the foregoing mathematical description.

An image can be scaled (i.e. resampled) in accordance with a scaling ratio, i.e. resampling ratio defined for each dimension as the number of output pixels desired after a transformation divided by the number of input pixels available before the transformation. For example, for one dimensional image data where the number of input pixels N is eight pixels per cm and the number of output pixels N' is ten pixels per cm, the scaling ratio R=N'/N is 10:8. To enlarge an image then, a scaling ratio greater than one is typically selected (e.g., 10:8). To reduce an image, a scaling ratio less than one is selected (e.g., 6:8) and when a scaling ratio of one is selected (e.g., 8:8), the output image is typically the same size as the input image.

Figure 2A:
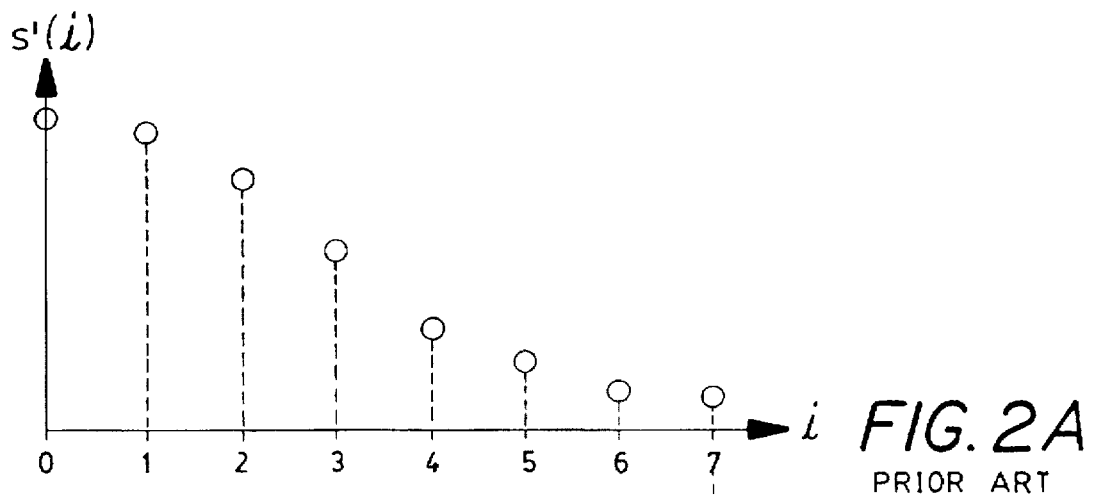
FIG. 2A is a graph of reconstructed image data points s'(i) vs. i for an eight element one dimensional matrix with a 1:1 scaling ratio.
Figure 2B:
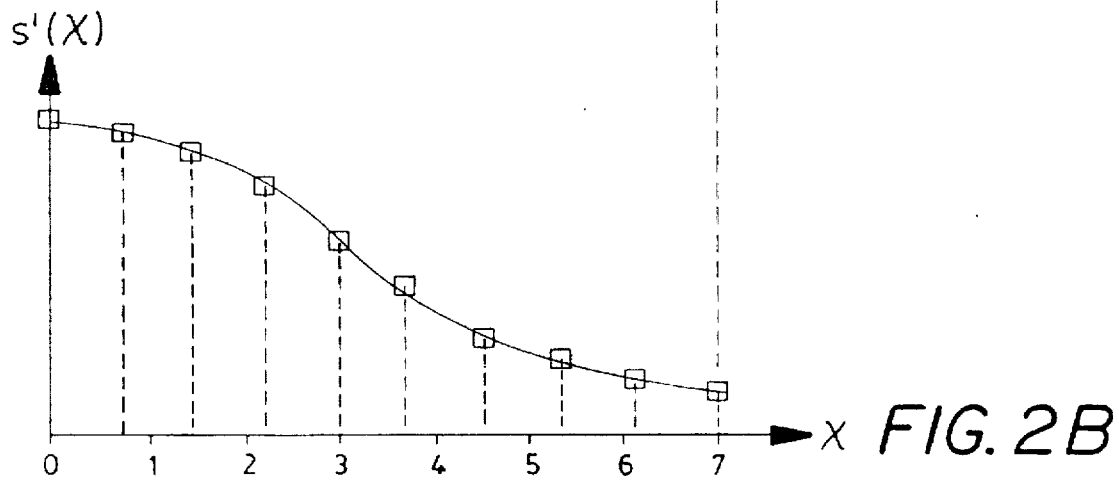
FIG. 2B is a graph (related to image enlargement) of reconstructed image data points s'(x) vs. x with a 10:8 scaling ratio over the same range of image data as in FIG. 2A.
Figure 2C:
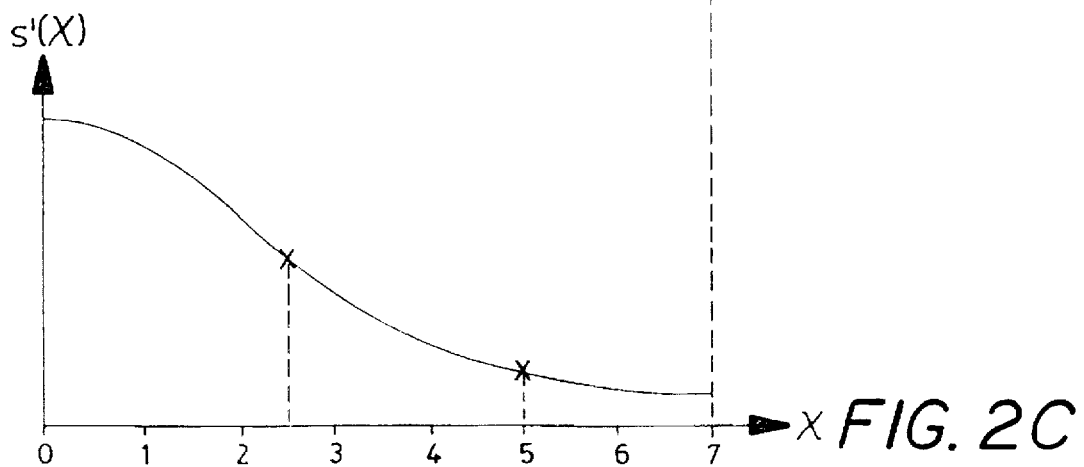
FIG. 2C is a graph (related to image reduction) of reconstructed image data points s'(x) vs. x with a 2:5 scaling ratio over the same range of image data as in FIG. 2A.

Examples of scaling one dimensional image data are shown in FIGS. 2A, 2B and 2C. FIG. 2A is a plot of the values from a second spatial matrix, s'(i), of image data points in one-dimension (designated by open circles), which were derived from equation (2) for the inverse transformation of a DCT matrix S(u) of eight DCT coefficients for $0 \leq i \leq 7$. The IDCT of equation (2) for one dimensional data, or equation (4) for two dimensional data, does not reconstruct image data points which fall between the discrete index values for the original image data points. However, there are instances in image processing when calculation of such intermediate values is desirable, e.g., image enlargement by interpolation and image reduction by decimation.

A reconstructed matrix of image data points s'(x) for one dimensional data can be derived from a hybrid IDCT which is given by equation (5). In other words, the hybrid IDCT of equation (5) provides for a continuous variable, x, indexed by $\Delta x$ for the range of $0 \leq i \leq (N-1)$, so that the reconstructed image data points s'(x) may be determined at non-integer values of x (e.g., $x_1 = 0.5$, $x_2 = 6.3$, $x_3 = 4.99712$, etc.). Instead of indexing i with an interval of $\Delta i$ equal to the interger value of 1 (the sampling rate for the original image data), x can be indexed at some other sampling rate, $\Delta x$, which can be smaller or larger than one in floating point form, as the case may be.

Due to the scaling, some of the reconstructed image data points will correspond to spatial locations different than the original image data points of the first spatial matrix s(i). In this manner, reconstructed image data points s'(x) can be determined which will fall between the discrete index values of the original image data points s(i).

$$s'(x) = \sqrt{\frac{2}{N}} \sum_{u=0}^{N-1} C_u S(u) \cos \frac{(2x+1)u\pi}{2N} \quad (5)$$

for $0 \leq x \leq (N-1)$, where:

s'(x) represents reconstructed image data points;

S(u) represents the DCT coefficients;

N represents the number of DCT coefficients;

x is a continuous variable over the range $0 \leq x \leq (N-1)$;

$$C_u = \frac{1}{\sqrt{2}}$$

for u=0; and $C_u = 1$ for $u \neq 0$.

An infinite number of reconstructed image data points, s'(x), can be theoretically derived to construct, for example, the curves of FIGS. 2B and 2C, while keeping within the appropriate range of the function s'(x) of equation (5). The index values, x, of the resampled image data points (as shown in FIGS. 2B and 2C) are determined by first selecting a scaling ratio, R. The scaling ratio is selected for each dimension of image data, e.g., one dimensional image data is scaled by a single scaling ratio, two dimensional image data is scaled in the first dimension by a first dimension scaling ratio and in the second dimension by a second dimension scaling ratio, etc., where the various resampling ratios may be the same or different.

The end points of contiguous groups of image data points (i.e., end points of each row and column of the image data points in matrix notation) are sometimes omitted during scaling but can be retained or recaptured if desired.

FIG. 2B shows an example of scaling up by resampling (or upsampling) in one dimension, where both end points have arbitrarily been retained. The spacing of the x index values in FIG. 2B is determined for a scaling ratio of 10:8, meaning ten reconstructed image data points s'(x) are sought for each eight image data points s(i) of the original image. In other words, the source axis, i.e. the i axis of FIG. 2A, is divided into seven segments (for eight image data points) and the target axis, i.e. the x axis of FIG. 2B, is divided into nine segments (for ten image data points). Hence, s'(x) for $0 \leq x \leq N$ is solved according to the relationship $1/9 = \Delta x/7$, where $\Delta x = 7/9$. In other words the ten image data points s'(x) of FIG. 2B, derived according to the 10:8 scaling ratio, are resampled for s(x) at 0, 7/9, 14/9, 21/9, 28/9, 35/9, 42/9, 49/9, 56/9, and 7 with respect to the original i-axis. In general, the new sampling interval for interpolation including both end points is given by:

$$\Delta x = \frac{N-1}{N'-1}$$

FIG. 2C shows an example of scaling down by resampling (or downsampling) in one dimension where a 2:5 scaling ratio is chosen and the zero index point (i.e. end point) is ignored. The scaling ratio of 2:5 indicates that only 0.4 of the number of originally sampled points are to be resampled. The spacing between resampled image data points is determined as $\Delta x$ 2.5. Hence, the resampled points designated by the index values for x fall within the given range of $0 \leq i \leq 7$ and x equals 2.5 and 5.0, omitting the zero end point in the given range as shown in FIG. 2C. The pitch between adjacent pixels is the inverse of the sampling ratio.

Enlarging An Image By Interpolation

One special case of scaling by resampling is enlarging an image by interpolation, defined as the process of generating (by approximation) a greater number N' of reconstructed image data points s'(x) than the original number N of image data points s(i).

Figure 3:
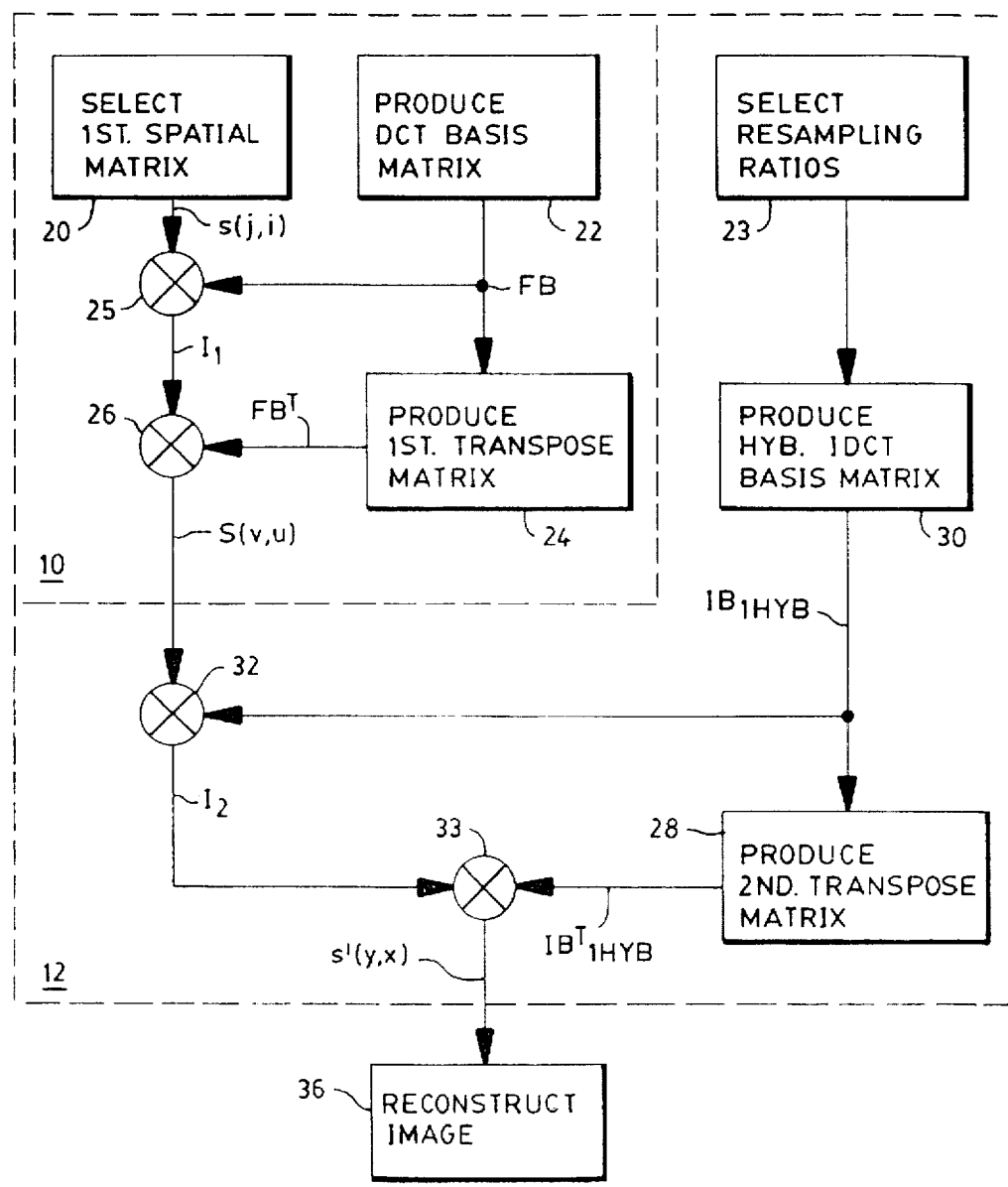
FIG. 3 is a block diagram of a first embodiment of a method for scaling an image in two-dimensional form where the scaling ratio may be changed, but is the same in both dimensions.

FIG. 3 is a block diagram of a preferred embodiment of a method of scaling by resampling an image of two dimensional data where the first dimension scaling ratio and the second dimension scaling ratio are equal and do not equal one. The forward DCT section is denoted by reference number 10 whereas the hybrid IDCT section is denoted by the reference number 12. A first spatial matrix s(j,i), as in the forward DCT equation (3), is selected in block 20 as an 8×8 group of pixels in the spatial domain example (shown below). Of course, it will be understood that the 8×8 matrix is usually but a subset of a larger set of original image data which has been remapped into smaller submatrices that serve as the input to the inventive methods and/or apparatus. In JPEG format, the adopted standard submatrix size may be 8×8 or 16×16. However, the pixel group, in the most general sense, can be of any convenient size that can be selected as a program parameter or directly by an operator.

| FIRST SPATIAL MATRIX, s(j,i) | | | | | | | |
|---|---|---|---|---|---|---|---|
| 100.00 | 120.00 | 140.00 | 160.00 | 100.00 | 100.00 | 100.00 | 100.00 |
| 100.00 | 100.00 | 120.00 | 140.00 | 160.00 | 100.00 | 100.00 | 100.00 |
| 120.00 | 100.00 | 100.00 | 120.00 | 140.00 | 160.00 | 100.00 | 100.00 |
| 140.00 | 120.00 | 100.00 | 100.00 | 120.00 | 140.00 | 160.00 | 100.00 |
| 160.00 | 140.00 | 120.00 | 100.00 | 100.00 | 120.00 | 140.00 | 160.00 |
| 100.00 | 120.00 | 140.00 | 160.00 | 100.00 | 100.00 | 100.00 | 100.00 |
| 100.00 | 100.00 | 120.00 | 140.00 | 160.00 | 100.00 | 100.00 | 100.00 |
| 120.00 | 100.00 | 100.00 | 120.00 | 140.00 | 160.00 | 100.00 | 100.00 |

Each element of the first spatial matrix s(j,i) represents an image data point corresponding to a pixel of an image. The pixel data is thus stored in the spatial domain in matrix form. The following 8×8 forward DCT basis matrix FB is produced in block 22 by evaluating the cosine terms of equation (3) for the two dimensional forward DCT by indexing first on u and v and then on i and j.

| FORWARD DCT BASIS MATRIX, FB | | | | | | | |
|---|---|---|---|---|---|---|---|
| 0.354 | 0.354 | 0.354 | 0.354 | 0.354 | 0.354 | 0.354 | 0.354 |
| 0.490 | 0.416 | 0.278 | 0.098 | −0.098 | −0.278 | −0.416 | −0.490 |
| 0.462 | 0.919 | −0.191 | −0.462 | −0.462 | −0.191 | 0.191 | 0.462 |
| 0.416 | −0.098 | −0.490 | −0.278 | 0.278 | 0.490 | 0.098 | −0.416 |
| 0.354 | −0.354 | −0.354 | 0.354 | 0.354 | −0.354 | −0.354 | 0.354 |
| 0.278 | −0.490 | 0.098 | 0.416 | −0.416 | −0.098 | 0.490 | −0.278 |
| 0.191 | −0.462 | 0.462 | −0.191 | −0.191 | 0.462 | −0.462 | 0.191 |
| 0.098 | −0.278 | 0.416 | −0.490 | 0.490 | −0.416 | 0.278 | −0.098 |

A first intermediate matrix $I_1$ as shown below is an 8×8 matrix generated in multiplier 25 by matrix product multiplication of the 8×8 forward DCT basis matrix FB times the 8×8 first spatial matrix s(j,i) (i.e., $I_1$=FB*s(j,i)).

| FIRST INTERMEDIATE MATRIX, $I_1$ | | | | | | | |
|---|---|---|---|---|---|---|---|
| 332.340 | 318.198 | 332.340 | 367.696 | 360.624 | 346.482 | 318.198 | 304.056 |
| −6.203 | 2.301 | 6.553 | 8.504 | −6.553 | −10.806 | 1.951 | −5.853 |
| −40.782 | −22.304 | 9.239 | 36.955 | 24.546 | −11.480 | −46.194 | −27.716 |
| −12.567 | 23.678 | 41.801 | 36.245 | −41.801 | −59.923 | −5.556 | 16.667 |
| 35.355 | 21.213 | −7.071 | −28.284 | −35.355 | 21.213 | 35.355 | 21.213 |
| −11.920 | −4.710 | −1.105 | 7.210 | 1.105 | −2.500 | 8.315 | −24.944 |
| −6.069 | 1.585 | 3.827 | 15.307 | −33.128 | 27.716 | −19.134 | −11.480 |
| 16.172 | 3.444 | −2.920 | −12.728 | 2.920 | 9.283 | −9.808 | 29.424 |

In block 24, the following 8×8 first transpose matrix, $FB^T$, is generated by transposing the above forward DCT basis matrix, FB.

| FIRST TRANSPOSE MATRIX, $FB^T$ | | | | | | | |
|---|---|---|---|---|---|---|---|
| 0.354 | 0.490 | 0.462 | 0.416 | 0.354 | 0.278 | 0.191 | 0.098 |
| 0.354 | 0.416 | 0.191 | −0.098 | −0.354 | −0.490 | −0.462 | −0.278 |
| 0.354 | 0.278 | −0.191 | −0.490 | −0.354 | 0.098 | 0.462 | 0.416 |
| 0.354 | 0.098 | −0.462 | −0.278 | 0.354 | 0.416 | −0.191 | −0.490 |
| 0.354 | −0.098 | −0.462 | 0.278 | 0.354 | −0.416 | −0.191 | 0.490 |
| 0.354 | −0.278 | −0.191 | 0.490 | −0.354 | −0.098 | 0.462 | −0.416 |
| 0.354 | −0.416 | 0.191 | 0.098 | −0.354 | 0.490 | −0.462 | 0.278 |
| 0.354 | −0.490 | 0.462 | −0.416 | 0.354 | −0.278 | 0.191 | −0.098 |

The 8×8 first intermediate matrix $I_1$ is next matrix product multiplied in multiplier 26 times the 8×8 first transpose matrix, $FB^T$, to generate the following 8×8 DCT matrix S(v,u) of DCT coefficients as defined in equation (3) (i.e. S(v,u)=$I_1$*FBT).

| DCT MATRIX, S(v,u) | | | | | | | |
|---|---|---|---|---|---|---|---|
| 947.500 | 10.632 | −50.581 | 16.730 | 17.500 | 9.417 | 2.010 | −6.588 |
| −3.573 | 6.265 | −4.483 | −12.875 | −3.573 | 7.684 | −6.609 | −0.299 |
| −27.484 | 10.490 | −72.730 | −21.370 | 22.537 | −8.165 | 5.732 | −5.382 |
| −0.515 | 33.688 | 11.396 | −86.570 | −0.515 | 19.912 | −14.895 | −6.955 |
| 22.500 | −6.111 | 63.647 | 19.165 | −27.500 | 11.044 | 3.402 | −9.918 |
| −10.094 | 1.955 | −19.490 | 4.306 | −10.094 | 12.679 | −11.975 | 2.475 |
| −7.557 | 9.356 | −9.268 | −1.511 | −17.453 | 9.149 | 22.730 | −38.912 |
| 12.653 | −5.906 | 23.158 | 3.529 | 12.653 | 17.875 | 16.480 | −2.374 |

Once the DCT matrix S(v,u) is determined as shown above, equation (4) is typically used to generate a second spatial matrix s'(j,i) of reconstructed image data points derived from the inverse discrete cosine transformation of DCT matrix S(v,u).

The inventive method of FIG. 3 allows resampling to generate an infinite number of reconstructed image data points s'(y,x) in two dimensional form over the given ranges of the hybrid IDCT of equation (6). The values of real number indices x and y are determined according to the scaling ratios previously discussed for the one dimensional IDCT example of FIG. 2B.

$$s'(y,x) = \sqrt{\frac{2}{N}} \sqrt{\frac{2}{M}} \sum_{u=0}^{N-1} \sum_{v=0}^{M-1} S(v,u) \cos \frac{(2x+1)u\pi}{2N} \cos \frac{(2y+1)v\pi}{2M} \quad (6)$$

for $0 \leq x \leq (N-1)$ and $0 \leq y \leq (M-1)$, where s'(y,x) is a two dimensional matrix of reconstructed image data points;

S(v,u) represents a two dimensional matrix of DCT coefficients;

N represents the number of DCT coefficients in the first dimension; and

M represents the number of DCT coefficients in the second dimension.

Since the first dimension scaling ratio equals the second dimension scaling ratio for the preferred embodiment of FIG. 3, then N'=M' for equation (6) where N' and M' are the number of output pixels for the first and second dimensions, respectively, as previously described for the one-dimensional case.

The conventional size of a two dimensional IDCT basis matrix is 8×8 in conformance with the above JPEG standard of equation (4). To enlarge each pixel group size by 25%, the first dimension scaling ratio and the second dimension scaling ratio are each selected in block 23 as 10:8. In other words, N'=M'=10, which means that the first dimension hybrid IDCT basis matrix $IB_{1HYB}$ generated in block 30 will be a 10×8 matrix as shown below.

| FIRST DIMENSION HYBRID IDCT BASIS MATRIX, $IB_{1HYB}$ | | | | | | | |
|---|---|---|---|---|---|---|---|
| 0.354 | 0.490 | 0.462 | 0.416 | 0.354 | 0.278 | 0.191 | 0.098 |
| 0.354 | 0.438 | 0.269 | 0.033 | −0.211 | −0.403 | −0.469 | −0.466 |
| 0.354 | 0.346 | −0.022 | −0.376 | −0.498 | −0.313 | 0.065 | 0.403 |
| 0.354 | 0.221 | −0.304 | −0.490 | −0.129 | 0.376 | 0.462 | 0.033 |
| 0.354 | 0.076 | −0.477 | −0.221 | 0.410 | 0.346 | −0.304 | −0.438 |
| 0.354 | −0.076 | −0.477 | 0.221 | 0.410 | −0.346 | −0.304 | 0.438 |
| 0.354 | −0.221 | −0.304 | 0.490 | −0.129 | −0.376 | 0.462 | −0.033 |
| 0.354 | −0.346 | −0.022 | 0.376 | −0.498 | 0.313 | 0.065 | −0.403 |
| 0.354 | −0.438 | 0.269 | −0.033 | −0.211 | 0.403 | −0.496 | 0.466 |
| 0.354 | −0.490 | 0.462 | −0.416 | 0.354 | −0.278 | 0.191 | −0.098 |

In multiplier 32, a 10×8 second intermediate, matrix $I_2$ (shown below) is generated by matrix product multiplication of the 10×8 first dimension hybrid IDCT basis matrix $IB_{1HYB}$ times the 8×8 DCT matrix S(v,u), i.e. $I_2 = IB_{1HYB} * S(v,u)$.

| SECOND INTERMEDIATE MATRIX, $I_2$ | | | | | | | |
|---|---|---|---|---|---|---|---|
| 325.269 | 25.279 | −31.543 | −38.234 | 0.000 | 19.038 | −2.242 | −18.350 |
| 323.191 | 9.042 | −50.960 | −14.983 | 23.295 | 1.504 | −15.971 | 17.360 |
| 331.110 | −6.306 | −39.125 | 24.903 | 25.473 | −17.401 | 14.082 | 0.969 |
| 333.036 | −8.914 | −21.492 | 50.581 | −9.094 | 4.728 | 10.906 | −13.185 |
| 350.419 | −10.303 | 25.909 | 42.521 | −19.705 | 17.362 | −16.121 | 11.431 |
| 368.808 | −2.886 | 65.467 | 6.308 | −1.316 | 0.561 | 1.025 | 4.607 |
| 340.873 | 20.272 | 4.966 | −32.098 | −1.258 | 12.495 | 7.145 | −21.580 |
| 316.672 | 20.676 | −58.083 | −31.431 | 11.035 | 14.608 | −13.333 | −0.591 |
| 330.009 | −2.581 | −41.594 | 8.729 | 30.114 | −12.970 | −3.501 | 17.860 |
| 332.340 | −8.810 | −29.958 | 43.294 | 7.071 | −8.612 | 20.063 | −13.185 |

The first dimension hybrid IDCT basis matrix $IB_{1HYB}$ is transposed in block 28 to generate the following 8×10 second transpose matrix, $IB_{1HYB}^T$.

| SECOND TRANSPOSE MATRIX $IB_{1HYB}^T$ | | | | | | | | | |
|---|---|---|---|---|---|---|---|---|---|
| 0.354 | 0.354 | 0.354 | 0.354 | 0.354 | 0.354 | 0.354 | 0.354 | 0.354 | 0.354 |
| 0.490 | 0.438 | 0.346 | 0.221 | 0.076 | −0.076 | −0.221 | −0.346 | −0.438 | −0.490 |
| 0.462 | 0.269 | −0.022 | −0.304 | −0.477 | −0.477 | −0.304 | −0.022 | 0.269 | 0.462 |
| 0.416 | 0.033 | −0.376 | −0.490 | −0.221 | 0.221 | 0.490 | 0.376 | −0.033 | −0.416 |
| 0.354 | −0.211 | −0.498 | −0.129 | 0.410 | 0.410 | −0.129 | −0.498 | −0.211 | 0.354 |
| 0.278 | −0.403 | −0.313 | 0.376 | 0.346 | −0.346 | −0.376 | 0.313 | 0.403 | −0.278 |
| 0.191 | −0.496 | 0.065 | 0.462 | −0.304 | −0.304 | 0.462 | 0.065 | −0.496 | 0.191 |
| 0.098 | −0.466 | 0.403 | 0.033 | −0.438 | 0.438 | −0.033 | −0.403 | 0.466 | −0.098 |

Finally in multiplier 33, the 10×10 second spatial matrix s'(y,x) of equation (6), which represents the reconstructed image data points of the 8×8 first spatial matrix s(j,i), is determined as follows by matrix product multiplication of the 10×8 second intermediate matrix $I_2$ times the 8×10 second transposed matrix $IB_{1HYB}^T$ (i.e., $s'(y,x) = I_2 * IB_{1HYB}^T$).

| \multicolumn{9}{c}{SECOND SPATIAL MATRIX, s'(y,x)} | | | | | | | | |
|---|---|---|---|---|---|---|---|---|
| 100.00 | 118.34 | 125.30 | 154.46 | 155.73 | 105.72 | 92.67 | 105.79 | 96.93 | 100.00 |
| 96.22 | 98.35 | 118.02 | 129.86 | 149.88 | 156.06 | 108.90 | 87.44 | 108.79 | 95.59 |
| 113.21 | 98.81 | 100.44 | 112.07 | 129.44 | 154.30 | 152.30 | 111.85 | 89.58 | 108.17 |
| 123.37 | 110.47 | 94.56 | 105.07 | 116.50 | 125.40 | 155.93 | 152.35 | 106.50 | 90.01 |
| 144.37 | 127.55 | 111.72 | 94.88 | 99.18 | 117.57 | 127.34 | 152.46 | 158.46 | 107.25 |
| 162.18 | 144.32 | 128.00 | 107.74 | 94.88 | 101.76 | 114.48 | 131.37 | 151.18 | 158.55 |
| 121.70 | 131.43 | 127.96 | 146.68 | 137.88 | 93.04 | 98.25 | 115.04 | 105.72 | 125.77 |
| 87.55 | 103.05 | 121.01 | 147.51 | 162.07 | 134.40 | 96.59 | 92.71 | 98.21 | 85.41 |
| 107.94 | 96.93 | 109.44 | 114.68 | 135.47 | 164.35 | 132.97 | 95.27 | 104.81 | 106.94 |
| 120.00 | 105.18 | 94.00 | 108.12 | 121.13 | 136.02 | 161.82 | 137.88 | 90.84 | 100.00 |

The second spatial matrix s'(y,x) provides reconstructed image data points which are used for reproduction of the image in block 36. Note that the original image of the above two dimensional interpolation example was represented by an 8×8 pixel group which was increased to a 10×10 pixel group by resampling using interpolation, according to the first dimension hybrid IDCT basis matrix $IB_{1HYB}$ derived from equation (6) as described above. This method facilitates image enlargement with excellent fidelity without compromising resolution.

The above preferred embodiment of the method of FIG. 3 is appropriate for two dimensional data when: the first dimension scaling ratio equals one and the second dimension scaling ratio does not equal one; the first dimension scaling ratio does not equal one and the second dimension scaling ratio equals one; and the first dimension scaling ratio does not equal one, the second dimension scaling ratio does not equal one, and the first dimension scaling ratio equals the second dimension scaling ratio. When different scaling ratios are selected by independent resampling of the image data points for each dimension, the method of FIG. 3 is modified as reflected in FIG. 4.

Figure 4:
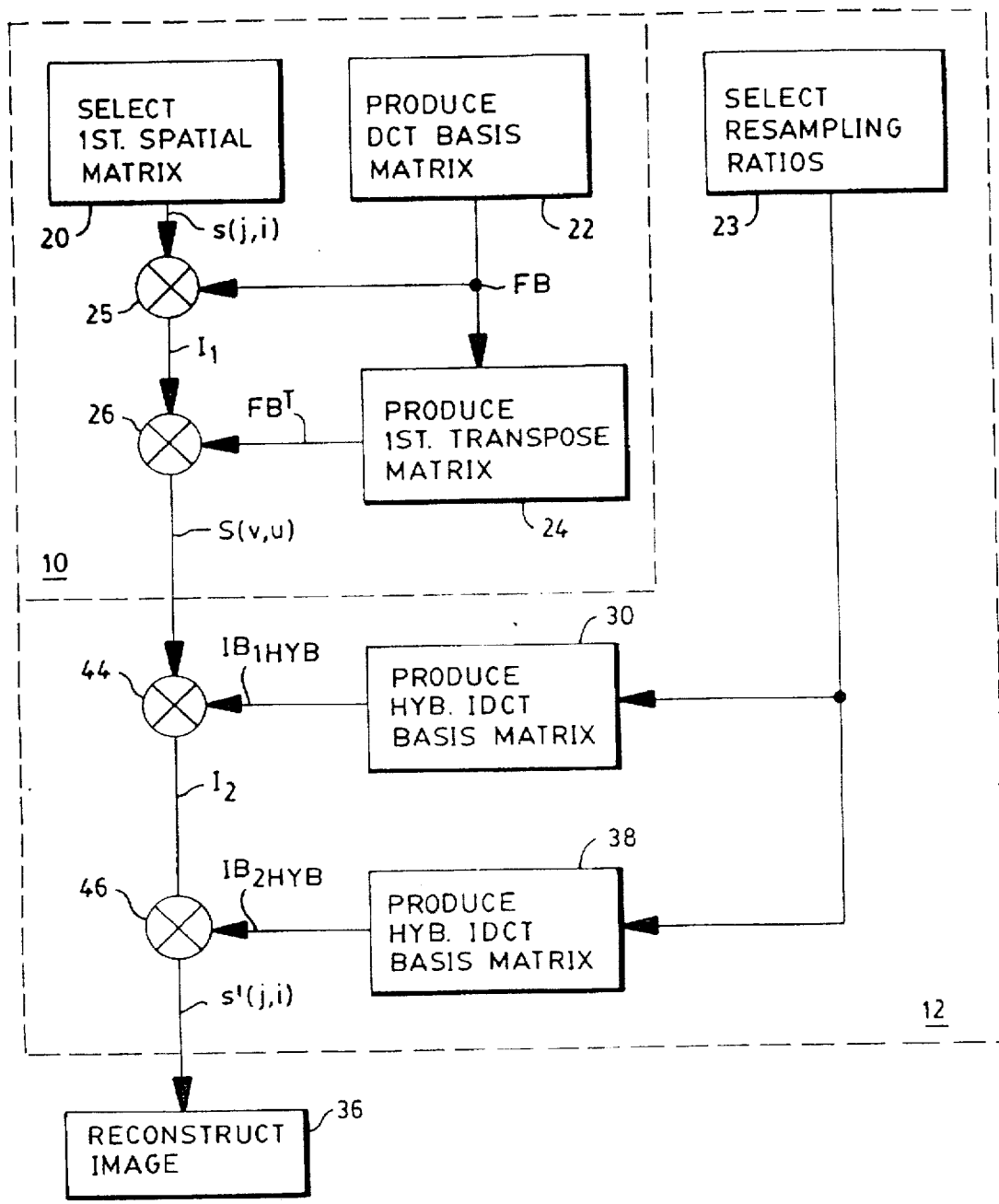
FIG. 4 is a block diagram of a second embodiment of a method for scaling an image in two dimensional form where the scaling ratio may be changed by different amounts in both dimensions.

FIG. 4 is a block diagram, including a forward DCT section 10 and a hybrid IDCT section 12, of a second embodiment of a method for scaling an image in two dimensional form where the first dimension scaling ratio does not equal one, the second dimension scaling ratio does not equal one, and the first dimension scaling ratio does not equal the second dimension scaling ratio. For example, for an 8×8 first spatial matrix s(j,i), the first dimension scaling ratio is selected in block 23 as 10:8 (N'=10) whereas the second dimension scaling ratio is selected as 12:8 (M'=12). In this case, the 10×8 first dimension hybrid IDCT basis matrix $IB_{1HYB}$ is generated in block 30, and the 8×12 second dimension hybrid IDCT basis matrix $IB_{2HYB}$ is generated in block 38. Multiplier 44 produces the 10×8 second intermediate matrix $I_2$ by matrix product multiplication of the 10×8 first dimension hybrid IDCT basis matrix $IB_{1HYB}$ times the 8×8 DCT matrix S(v,u) (i.e. $I_2 = IB_{1HYB}*S(v,u)$). In multiplier 46, the second spatial matrix s'(j,i) is generated by matrix product multiplication of the 10×8 second intermediate matrix $I_2$ times the 8×12 second dimension hybrid IDCT basis matrix $IB_{2HYB}$ (i.e. $s'(y,x)=I_2*IB_{2HYB}$). From the second spatial matrix s'(j,i), the image can be printed, processed, or otherwise reconstructed in block 36.

Figure 5:
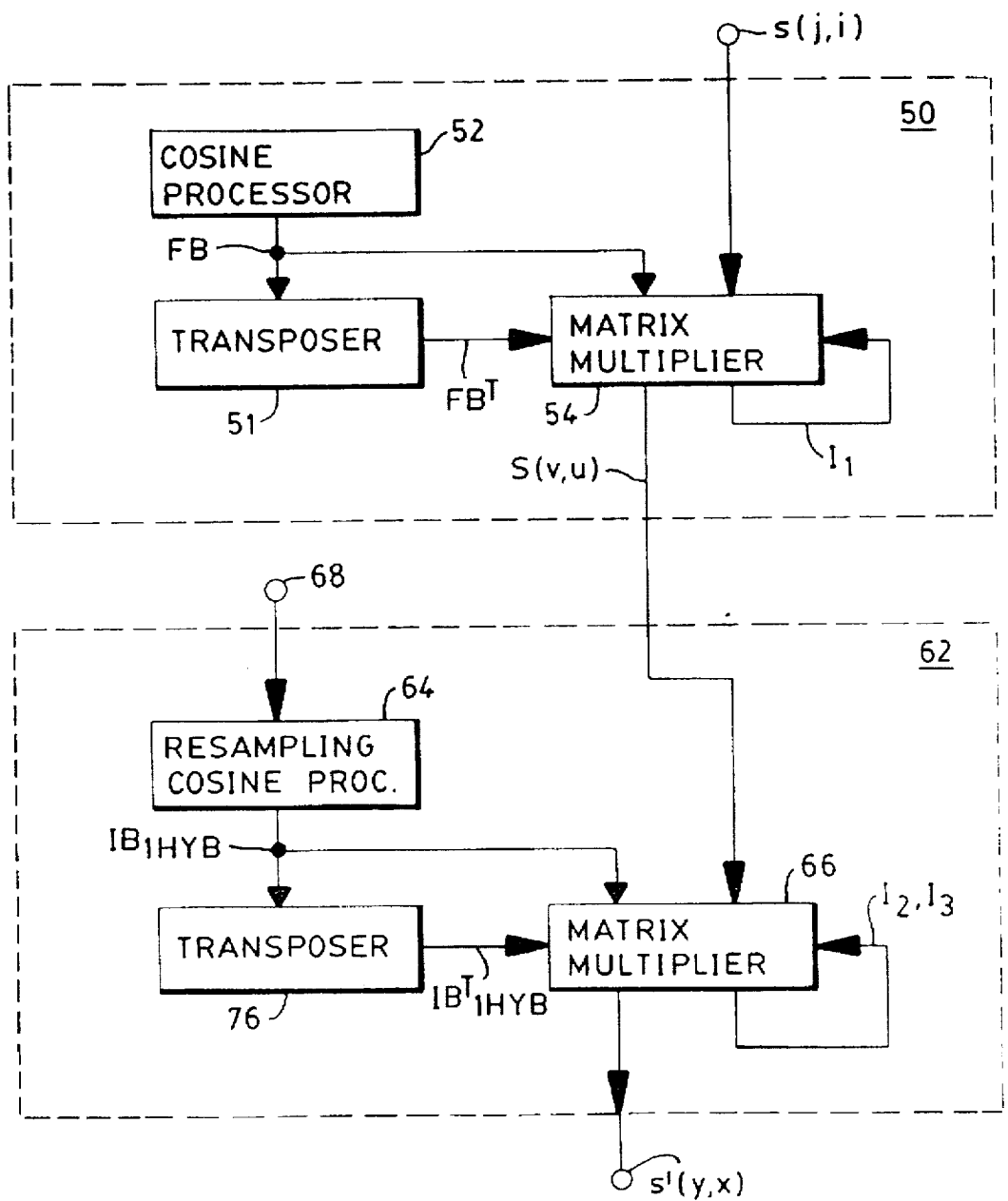
FIG. 5 is a schematic block diagram of an apparatus for scaling an image according to the method of FIG. 3.

An apparatus corresponding to the method of FIG. 3 is shown in FIG. 5. A forward discrete cosine transform processor 50 transforms the first spatial matrix s(j,i) into DCT matrix S(v,u) in matrix multiplier 54. After processing the DCT matrix S(v,u) in the frequency domain, for instance for compression in a processor not shown, the second spatial matrix s'(y,x) of reconstructed image data points is generated in matrix multiplier 66 of the hybrid IDCT processor 62.

A digital representation of an image (not shown) is represented by the first spatial matrix s(j,i) and input to the forward DCT processor 50, which includes a cosine processor 52, a transposer 51 and a matrix multiplier 54. The cosine processor 52 generates the forward DCT basis matrix FB in the DCT domain by processing the cosine terms of equation (3). The transposer 51 produces the first transpose matrix $FB^T$ by transposing the forward DCT basis matrix FB. The matrix multiplier 54 initially produces the first intermediate matrix $I_1$ by matrix product multiplication of the forward DCT basis matrix FB times the first spatial matrix s(j,i). The matrix multiplier 54 then generates the DCT matrix S(v,u) of DCT coefficients in the frequency domain by matrix product multiplication of the first intermediate matrix $I_1$ times the first transpose matrix $FB^T$.

If desired, the DCT matrix S(v,u) can be decreased in size (i.e. decimated) in a microprocessor or other appropriate circuitry (not shown). Interpolation is typically provided in the spatial domain in the form of linear interpolation. Interpolation or increasing the number of reconstructed image data points s'(y,x) can be accomplished in the hybrid IDCT processor 62, which includes a resampling cosine processor 64, a transposer 76 and a matrix multiplier 66. The resampling cosine processor 64 produces a first dimension hybrid IDCT basis matrix $IB_{1HYB}$ in response to the first dimension scaling ratio received at terminal 68 along with the second dimension scaling ratio. Note for this example that the first dimension scaling ratio does not equal one, the second dimension scaling ratio does not equal one, and the first dimension scaling ratio equals the second dimension scaling ratio. The elements of the first dimension hybrid IDCT basis matrix $IB_{1HYB}$ are derived from the first dimension cosine terms of equation (6). The transposer 76 produces the second transposed matrix $IB_{1HYB}^T$ by transposing the first dimension hybrid IDCT basis matrix $IB_{1HYB}$. The second intermediate matrix $I_2$ is generated by matrix product multiplication of the first dimension hybrid IDCT basis matrix $IB_{1HYB}$ matrix times the DCT matrix S(v,u) in matrix multiplier 66. Finally, the matrix multiplier 66 generates the second spatial matrix s'(y,x) by matrix product multiplication of the second intermediate matrix $I_2$ times the second transpose matrix $IB_{1HYB}^T$. The image can now be printed or otherwise reconstructed using the reconstructed image data of s'(y,x).

The above methods of FIG. 3 and 4 for enlarging an image by interpolation can also be used for reducing an image by decimation using downsampling, where the scaling ratios are selected to be less than one, and the image data is well behaved for this application. However for best results, the method of reducing an image by decimation using downsampling is generally preceded by low pass filtering to remove high frequency components which might cause aliasing.

Filtering

Typically, filtering an image in the DCT domain in a manner similar to a mathematical convolution in the spatial domain involves operations of the DCI matrix S(v,u) of DCT coefficients with a matrix of kernel values represented as a DCT kernel matrix of DCT kernel coefficients.

Convolution of an image, as understood by those of ordinary skill in the art, is a process of filtering in the spatial domain by multiplying two discrete signals point-by-point then summing the products over appropriate limits. Convolution generally results in filtering by sharpening or smoothing an image. Sharpening enhances blurry images, particularly by enhancing high frequency components representing edges in an image, whereas smoothing softens the edges of the image. The kernel is defined as the signal values of a filter used for performing a specific filtering operation such as sharpening or smoothing in the spatial or frequency domain. The kernel may be selected in the spatial or frequency domain according to a designer's predetermined criteria for sharpening, smoothing, or the like.

Known methods for filtering an image in the frequency domain, in a manner similar to a mathematical convolution in the spatial domain, require computation of complex numbers when processing the kernel as previously described. The following filtering method performed in the DCT domain obviates the need for the calculation of imaginary numbers when processing the kernel, thus minimizing computational complexity, time and effort.

Image data is filtered in the DCT domain in a manner mathematically equivalent to a convolution in the spatial domain for one dimensional data by: (1) generating a DCT matrix S(u) of DCT coefficients by taking a discrete even cosine transform (DECT) of a first spatial matrix s(i) of image data points; (2) generating a DOCT matrix H(u) of DOCT coefficients by taking a discrete odd cosine transform (DOCT) of a kernel matrix h(i); (3) generating a mask multiplied matrix by mask multiplying S(u) with H(u); and (4) generating a second spatial matrix s'(i) of reconstructed image data points by taking an IDCT of the mask multiplied matrix. It will be understood by those skilled in the art that a discrete even cosine transformation (DECT) is conventionally referred to as a discrete cosine transformation (DCT). Also, in a preferred embodiment the kernel h(i) is odd and symmetric.

Since images contain varying amounts of high frequency content, aliasing often results during transformation operations. When the amount of high frequency content is problematic, then the above filtering procedure would further include the steps of: selecting an overlap of adjacent first spatial matrices s(i) prior to generating DCT matrices S(u); and generating filtered saved regions $s'_S(i)$ of the second spatial matrices s'(i) by discarding certain selected elements of the second spatial matrices s'(i).

Mathematically, the one dimensional expression for filtering in a manner equivalent to a mathematical convolution is defined by equation (7).

$$s(i) \oplus h(i) \Leftrightarrow S(u) \blacksquare H(u) \quad (7)$$

where s(i) represents the first spatial matrix of image data points;

h(i) represents the kernel matrix in the spatial domain;

$s(i) \oplus h(i)$ represents the filtering or convolution of s(i) with h(i);

H(u) represents the DOCT matrix derived from h(i);

S(u) represents the DCT matrix derived frown s(i);

i and u are integer indices;

$\oplus$ is the convolution operator; and $\blacksquare$ designates mask multiplication.

The above DCT matrix S(u) for one dimensional data is derived from equation (1), whereas the one dimensional DOCT matrix H(u) is derived as follows from equation (8) where h(i) is an odd symmetric kernel of size k.

$$H(u) = 2 \sum_{i=0}^{N-1} d_i h(i) \cos \frac{i u \pi}{N} \quad (8)$$

for $0 \leq u \leq (N-1)$; where

N represents the size of the DCT matrix used;

h(i)=0 for |i|>(k−1)/2;

$d_i = \frac{1}{2}$ for i=0;

$d_i = 1$ for i=1, 2 . . . (N−1);

i, u and N are integers; and k is the kernel size.

Of course, the above mathematical filtering analysis could be readily extended to image data presented in any number of dimensions.

Figure 6:
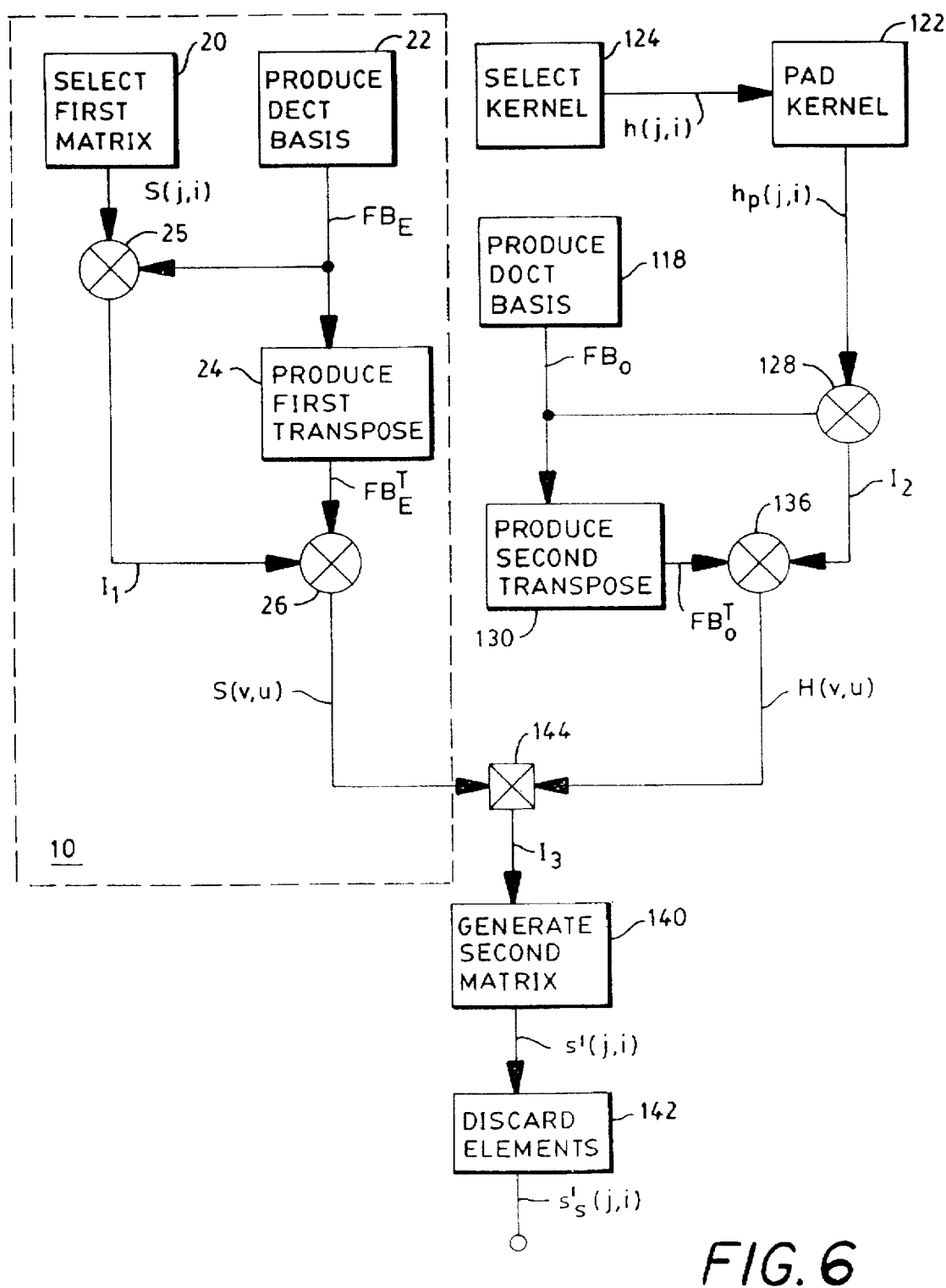
FIG. 6 is a schematic block diagram of steps for filtering an image in the frequency domain by a method mathematically equivalent to a convolution in the spatial domain.

A preferred embodiment of a method of filtering two dimensional image data in the DCT domain, in a manner equivalent to a mathematical convolution in the spatial domain, is depicted in FIG. 6 which includes a forward DCT section 10 having steps identical to those previously described for the interpolation method of FIG. 3. As an example, the, 8×8 first spatial matrix s(j,i) of 64 image data points listed below is selected in block 20 as shown below.

| FIRST SPATIAL MATRIX, s(j,i) | | | | | | | |
|---|---|---|---|---|---|---|---|
| 100.00 | 120.00 | 140.00 | 160.00 | 100.00 | 100.00 | 100.00 | 100.00 |
| 100.00 | 100.00 | 120.00 | 140.00 | 160.00 | 100.00 | 100.00 | 100.00 |
| 120.00 | 100.00 | 100.00 | 120.00 | 140.00 | 160.00 | 100.00 | 100.00 |
| 140.00 | 120.00 | 100.00 | 100.00 | 100.00 | 140.00 | 160.00 | 100.00 |
| 160.00 | 140.00 | 120.00 | 100.00 | 100.00 | 120.00 | 140.00 | 160.00 |
| 100.00 | 120.00 | 140.00 | 160.00 | 100.00 | 100.00 | 100.00 | 100.00 |
| 100.00 | 100.00 | 120.00 | 140.00 | 160.00 | 100.00 | 100.00 | 100.00 |
| 120.00 | 100.00 | 100.00 | 120.00 | 140.00 | 160.00 | 100.00 | 100.00 |

The following 8×8 forward DECT basis matrix $FB_E$ is derived from the cosine terms of equation (3) in block 22.

| FORWARD DECT BASIS MATRIX, $FB_B$ | | | | | | | |
|---|---|---|---|---|---|---|---|
| 0.354 | 0.354 | 0.354 | 0.354 | 0.354 | 0.354 | 0.354 | 0.354 |
| 0.490 | 0.416 | 0.278 | 0.098 | −0.098 | −0.278 | −0.416 | −0.490 |
| 0.462 | 0.919 | −0.191 | −0.462 | −0.462 | −0.191 | 0.191 | 0.462 |
| 0.416 | −0.098 | −0.490 | −0.278 | 0.278 | 0.490 | 0.098 | −0.416 |
| 0.354 | −0.354 | −0.354 | 0.354 | 0.354 | −0.354 | −0.354 | 0.354 |
| 0.278 | −0.490 | 0.098 | 0.416 | −0.416 | −0.098 | 0.490 | −0.278 |
| 0.191 | −0.462 | 0.462 | −0.191 | −0.191 | 0.462 | −0.462 | 0.191 |
| 0.098 | −0.278 | 0.416 | −0.490 | 0.490 | −0.416 | 0.278 | −0.098 |

The following 8×8 first intermediate matrix $I_1$ is generated in multiplier 25 by matrix product multiplication of the 8×8 forward DECT matrix $FB_E$ times the 8×8 first spatial matrix s(j,i).

| FIRST INTERMEDIATE MATRIX, $I_1$ | | | | | | | |
|---|---|---|---|---|---|---|---|
| 332.340 | 318.198 | 332.340 | 367.696 | 360.624 | 346.482 | 318.198 | 304.056 |
| −6.203 | 2.301 | 6.553 | 8.504 | −6.553 | −10.806 | 1.951 | −5.853 |
| −40.782 | −22.304 | 9.239 | 36.955 | 24.546 | −11.480 | −46.194 | −27.716 |
| −12.567 | 23.678 | 41.801 | 36.245 | −41.801 | −59.923 | −5.556 | 16.667 |
| 35.355 | 21.213 | −7.071 | −28.284 | −35.355 | 21.213 | 35.355 | 21.213 |
| −11.920 | −4.710 | −1.105 | 7.210 | 1.105 | −2.500 | 8.315 | −24.944 |
| −6.069 | 1.585 | 3.827 | 15.307 | −33.128 | 27.716 | −19.134 | −11.480 |
| 16.172 | 3.444 | −2.920 | −12.728 | 2.920 | 9.283 | −9.808 | 29.424 |

In block 24, the following 8×8 first transpose matrix $FB_E^T$ is generated by transposing the above 8×8 forward DCT basis matrix $FB_E$.

| FIRST TRANSPOSE MATRIX, $FB_E^T$ | | | | | | | |
|---|---|---|---|---|---|---|---|
| 0.354 | 0.490 | 0.462 | 0.416 | 0.354 | 0.278 | 0.191 | 0.098 |
| 0.354 | 0.416 | 0.191 | −0.098 | −0.354 | −0.490 | −0.462 | −0.278 |
| 0.354 | 0.278 | −0.191 | −0.490 | −0.354 | 0.098 | 0.462 | 0.416 |
| 0.354 | 0.098 | −0.462 | −0.278 | 0.354 | 0.416 | −0.191 | −0.490 |
| 0.354 | −0.098 | −0.462 | 0.278 | 0.354 | −0.416 | −0.191 | 0.490 |
| 0.354 | −0.278 | −0.191 | 0.490 | −0.354 | −0.098 | 0.462 | −0.416 |
| 0.354 | −0.416 | 0.191 | 0.098 | −0.354 | 0.490 | −0.462 | 0.278 |
| 0.354 | −0.490 | 0.462 | −0.416 | 0.354 | −0.278 | 0.191 | −0.098 |

The first intermediate matrix $I_1$ is matrix product multiplied in multiplier 26 times the first transpose matrix $FB_E^T$ to generate the following DCT matrix $S(v,u)$ of DCT coefficients as defined in equation (3) (i.e. $S(v,u)=I_1*FB_E^T$)

| DCT MATRIX, $S(v,u)$ | | | | | | | |
|---|---|---|---|---|---|---|---|
| 947.500 | 10.632 | −50.581 | 16.730 | 17.500 | 9.417 | 2.010 | −6.588 |
| −3.573 | 6.265 | −4.483 | −12.875 | −3.573 | 7.684 | −6.609 | −0.299 |
| −27.484 | 10.490 | −72.730 | −21.370 | 22.537 | −8.165 | 5.732 | −5.382 |
| −0.515 | 33.688 | 11.396 | −86.570 | −0.515 | 19.912 | −14.895 | −6.955 |
| 22.500 | −6.111 | 63.647 | 19.165 | −27.500 | 11.044 | 3.402 | −9.918 |
| −10.094 | 1.955 | −19.490 | 4.306 | −10.094 | 12.679 | −11.975 | 2.475 |
| −7.557 | 9.356 | −9.268 | −1.511 | −17.453 | 9.149 | 22.730 | −38.912 |
| 12.653 | −5.906 | 23.158 | 3.529 | 12.653 | 17.875 | 16.480 | −2.374 |

The above described steps complete the determination of the two dimensional forward DECT matrix $S(v,u)$ necessary in equation (7). Next, the two dimensional forward DOCT matrix $H(v,u)$ must be determined. The following 5×5 odd, symmetrical kernel $h(j,i)$ in the spatial domain was arbitrarily selected in block 124 to illustrate the preferred embodiment of the filtering process.

| KERNEL MATRIX, $h(j,i)$ | | | | |
|---|---|---|---|---|
| 0.006 | 0.025 | 0.037 | 0.025 | 0.006 |
| 0.025 | −0.330 | −0.709 | −0.330 | 0.025 |
| 0.037 | −0.709 | 4.782 | −0.709 | 0.037 |
| 0.025 | −0.330 | −0.709 | −0.330 | 0.025 |
| 0.006 | 0.025 | 0.037 | 0.025 | 0.006 |

In order to facilitate multiplication of the 5×5 kernel matrix $h(j,i)$ with other 8×8 matrixes (selected for this example and in conformance with the international JPEG standard matrix size), the 5×5 kernel matrix $h(j,i)$ is padded in block 122 to generate an 8×8 padded kernel matrix $h_P(j,i)$ in the spatial domain. The padding is accomplished by inserting the lower right quadrant of the odd, symmetric kernel into the upper left quadrant of the padded kernel matrix $h_P(j,i)$, then setting the remaining elements of $h_P(j,i)$ to zero as shown below.

| PADDED KERNEL MATRIX, $h_p(j,i)$ | | | | | | | |
|---|---|---|---|---|---|---|---|
| 4.782 | −0.709 | 0.037 | 0.000 | 0.000 | 0.000 | 0.000 | 0.000 |
| −0.709 | −0.330 | 0.025 | 0.000 | 0.000 | 0.000 | 0.000 | 0.000 |
| 0.037 | 0.025 | 0.006 | 0.000 | 0.000 | 0.000 | 0.000 | 0.000 |
| 0.000 | 0.000 | 0.000 | 0.000 | 0.000 | 0.000 | 0.000 | 0.000 |
| 0.000 | 0.000 | 0.000 | 0.000 | 0.000 | 0.000 | 0.000 | 0.000 |
| 0.000 | 0.000 | 0.000 | 0.000 | 0.000 | 0.000 | 0.000 | 0.000 |
| 0.000 | 0.000 | 0.000 | 0.000 | 0.000 | 0.000 | 0.000 | 0.000 |
| 0.000 | 0.000 | 0.000 | 0.000 | 0.000 | 0.000 | 0.000 | 0.000 |

The two dimensional DOCT matrix $H(v,u)$ is derived as follows from equation (9).

$$H(v,u) = 4 \sum_{i=0}^{N-1} \sum_{j=0}^{M-1} d_i d_j h_P(j,i) \cos\frac{iu\pi}{N} \cos\frac{jv\pi}{M} \quad (9)$$

for $0 \leq u \leq (N-1)$ and $0 \leq v \leq (N-1)$, where $h_P(j,i)$ is the two dimensional padded kernel matrix;

N is the number of elements of $h_P(j,i)$ in the first dimension;

M is the number of elements of $h_P(j,i)$ in the second dimension;

$d_i = \frac{1}{2}$ for $i=0$;

$d_i = 1$ for $i=1, 2, \ldots (N-1)$;

$d_j = \frac{1}{2}$ for $j=0$;

$d_j = 1$ for $j=1,2, \ldots (M-1)$;

i, j, u, v, N, M are integers; and $$k_P(j,i) = 0 \text{ for } |i| \text{ or } |j| > \frac{(k-1)}{2}$$

An 8×8 forward DOCT basis matrix $FB_O$ (listed below) is derived in block 18 from the cosine terms of equation (9).

| FORWARD DOCT BASIS MATRIX, FB$_O$ | | | | | | | |
|---|---|---|---|---|---|---|---|
| 1.000 | 2.000 | 2.000 | 2.000 | 2.000 | 2.000 | 2.000 | 2.000 |
| 1.000 | 1.848 | 1.414 | 0.765 | −0.000 | −0.765 | −1.414 | −1.848 |
| 1.000 | 1.414 | −0.000 | −1.414 | −2.000 | −1.414 | 0.000 | 1.414 |
| 1.000 | 0.765 | −1.414 | −1.848 | 0.000 | 1.848 | 1.414 | −0.765 |
| 1.000 | −0.000 | −2.000 | 0.000 | 2.000 | −0.000 | −2.000 | 0.000 |
| 1.000 | −0.765 | −1.414 | 1.848 | −0.000 | −1.848 | 1.414 | 0.765 |
| 1.000 | −1.414 | 0.000 | 1.414 | −2.000 | 1.414 | −0.000 | −1.414 |
| 1.000 | −1.848 | 1.414 | −0.765 | 0.000 | 0.765 | −1.414 | 1.848 |

In multiplier 128, the following 8×8 second intermediate matrix 12 is generated by matrix product multiplication of the 8×8 forward DOCT basis matrix FB$_o$ times the 8×8 padded kernel matrix h$_p$(j,i).

| SECOND INTERMEDIATE MATRIX, I$_2$ | | | | | | | |
|---|---|---|---|---|---|---|---|
| 3.439 | −1.319 | 0.099 | 0.000 | 0.000 | 0.000 | 0.000 | 0.000 |
| 3.525 | −1.283 | 0.092 | 0.000 | 0.000 | 0.000 | 0.000 | 0.000 |
| 3.779 | −1.175 | 0.072 | 0.000 | 0.000 | 0.000 | 0.000 | 0.000 |
| 4.187 | −0.996 | 0.047 | 0.000 | 0.000 | 0.000 | 0.000 | 0.000 |
| 4.708 | −0.759 | 0.025 | 0.000 | 0.000 | 0.000 | 0.000 | 0.000 |
| 5.272 | −0.492 | 0.009 | 0.000 | 0.000 | 0.000 | 0.000 | 0.000 |
| 5.785 | −0.243 | 0.002 | 0.000 | 0.000 | 0.000 | 0.000 | 0.000 |
| 6.145 | −0.065 | 0.000 | 0.000 | 0.000 | 0.000 | 0.000 | 0.000 |

The 8×8 forward DOCT basis matrix FB$_o$ is transposed in block 130 to produce the following 8×8 second transposed matrix, FB$_O^T$.

| SECOND TRANSPOSED MATRIX, FB$_O^T$ | | | | | | | |
|---|---|---|---|---|---|---|---|
| 1.000 | 1.000 | 1.000 | 1.000 | 1.000 | 1.000 | 1.000 | 1.000 |
| 2.000 | 1.848 | 1.414 | 0.765 | −0.000 | −0.765 | −1.414 | −1.848 |
| 2.000 | 1.414 | −0.000 | −1.414 | −2.000 | −1.414 | 0.000 | 1.414 |
| 2.000 | 0.765 | −1.414 | −1.848 | 0.000 | 1.848 | 1.414 | −0.765 |
| 2.000 | −0.000 | −2.000 | 0.000 | 2.000 | −0.000 | −2.000 | 0.000 |
| 2.000 | −0.765 | −1.414 | 1.848 | −0.000 | −1.848 | 1.414 | 0.765 |
| 2.000 | −1.414 | 0.000 | 1.414 | −2.000 | 1.414 | −0.000 | −1.414 |
| 2.000 | −1.848 | 1.414 | −0.765 | 0.000 | 0.765 | −1.414 | 1.848 |

Multiplier 136 generates the following 8×8 forward DOCT matrix H(v,u) by matrix product multiplication of the 8×8 second intermediate matrix I$_2$ times the second transpose matrix FB$_o$.

| FORWARD DOCT MATRIX, H(v,u) | | | | | | | |
|---|---|---|---|---|---|---|---|
| 1.000 | 1.143 | 1.574 | 2.289 | 3.240 | 4.307 | 5.303 | 6.016 |
| 1.143 | 1.284 | 1.710 | 2.413 | 3.341 | 4.377 | 5.339 | 6.025 |
| 1.574 | 1.710 | 2.117 | 2.778 | 3.635 | 4.576 | 5.441 | 6.053 |
| 2.289 | 2.413 | 2.778 | 3.357 | 4.092 | 4.882 | 5.596 | 6.095 |
| 3.240 | 3.341 | 3.635 | 4.092 | 4.658 | 5.253 | 5.780 | 6.144 |
| 4.307 | 4.377 | 4.576 | 4.882 | 5.253 | 5.635 | 5.967 | 6.194 |
| 5.303 | 5.339 | 5.441 | 5.596 | 5.780 | 5.967 | 6.128 | 6.236 |
| 6.016 | 6.025 | 6.053 | 6.095 | 6.144 | 6.194 | 6.236 | 6.265 |

At this point, both functions S(v,u) and H(v,u) located on the right side of equation (7) have been determined. Thus by mask multiplying, the 8×8 forward DCT matrix S(v,u) times the 8×8 forward DOCT matrix H(v,u) in the mask multiplier 144, the following 8×8 third intermediate matrix, I$_3$, is generated.

| THIRD INTERMEDIATE MATRIX, I$_3$ | | | | | | | |
|---|---|---|---|---|---|---|---|
| 947.500 | 12.147 | −79.602 | 38.292 | 56.698 | 40.562 | 10.658 | −39.631 |
| −4.082 | 8.044 | −8.283 | −31.065 | −11.935 | 33.631 | −35.284 | −1.801 |
| −43.253 | 17.941 | −153.998 | −59.356 | 81.912 | −37.366 | 31.191 | −32.580 |
| −1.178 | 81.280 | 31.652 | −290.610 | −2.105 | 97.215 | −83.353 | −42.392 |
| 72.897 | −20.417 | 231.332 | 78.419 | −128.091 | 58.017 | 19.667 | −60.943 |
| −43.477 | 8.557 | −89.196 | 21.021 | −53.022 | 71.447 | −71.460 | 15.329 |
| −40.080 | 49.954 | −50.429 | −8.453 | −100.885 | 54.596 | 139.289 | −252.666 |
| 76.113 | −35.583 | 140.178 | 21.509 | 77.744 | −110.722 | 102.776 | −14.871 |

To reconstruct the filtered image, the DCT coefficients of the third intermediate matrix I$_3$ are first transformed to the spatial domain. The 8×8 second spatial matrix s'(j,i) of reconstructed image data points shown below is generated in block 140 by performing an inverse discrete cosine transformation as in equation(4) on the 8×8 third intermediate matrix, I$_3$. The filtered image can then be printed or otherwise reproduced from the reconstructed image data points of the second spatial matrix s'(v,u).

| SECOND SPATIAL MATRIX, s'(j,i) | | | | | | | | |
|---|---|---|---|---|---|---|---|---|
| 100.00 | 118.34 | 125.30 | 154.46 | 155.73 | 105.72 | 92.67 | 105.79 | 96.93 | 100.00 |
| 96.22 | 98.35 | 118.02 | 129.86 | 149.88 | 156.06 | 108.90 | 87.44 | 108.79 | 95.59 |
| 113.21 | 98.81 | 100.44 | 112.07 | 129.44 | 154.30 | 152.30 | 111.85 | 89.58 | 108.17 |
| 123.37 | 110.47 | 94.56 | 105.07 | 116.50 | 125.40 | 155.93 | 152.35 | 106.50 | 90.01 |
| 144.37 | 127.55 | 111.72 | 94.88 | 99.18 | 117.57 | 127.34 | 152.46 | 158.46 | 107.25 |
| 162.18 | 144.32 | 128.00 | 107.74 | 94.88 | 101.76 | 114.48 | 131.37 | 151.18 | 158.55 |
| 121.70 | 131.43 | 127.96 | 146.68 | 137.88 | 93.04 | 98.25 | 115.04 | 105.72 | 125.77 |
| 87.55 | 103.05 | 121.01 | 147.51 | 162.07 | 134.40 | 96.59 | 92.71 | 98.21 | 85.41 |

-continued

| SECOND SPATIAL MATRIX, s'(j,i) | | | | | | | | | |
|---|---|---|---|---|---|---|---|---|---|
| 107.94 | 96.93 | 109.44 | 114.68 | 135.47 | 164.35 | 132.97 | 95.27 | 104.81 | 106.94 |
| 120.00 | 105.18 | 94.00 | 108.12 | 121.13 | 136.02 | 161.82 | 137.88 | 90.84 | 100.00 |

As earlier noted, the above method is adequate when the image is relatively free from aliasing due to high frequency components. However, many images require the addition of an overlapping procedure in the above filtering method which is directed at eliminating aliasing due to high frequency components. When the high frequency components do not effectively disturb the desired image quality, then the overlapping procedure can be excluded and the above second spatial matrix s'(j,i) is adequate to print or otherwise reproduce the original image. In the event that aliasing is a problem, then an overlapping procedure such as the one described below in conjunction with FIG. 7 is instituted together with the above method wherein certain reconstructed image data points of the second spatial matrix s'(j,i) are discarded, resulting in a filtered saved region designated as $s'_S(j,i)$.

For a kernel size of 5×5, i.e. k=5, a k−1 overlap of four pixels between pixel groups is used to provide a 4×4 saved region of filtered pixels for an 8×8 group of pixels to be processed. Thus, for filtering with overlap in a manner similar to a mathematical convolution, each 8×8 pixel group of the image preferably overlaps each adjacent pixel group by four pixels.

Figure 7:
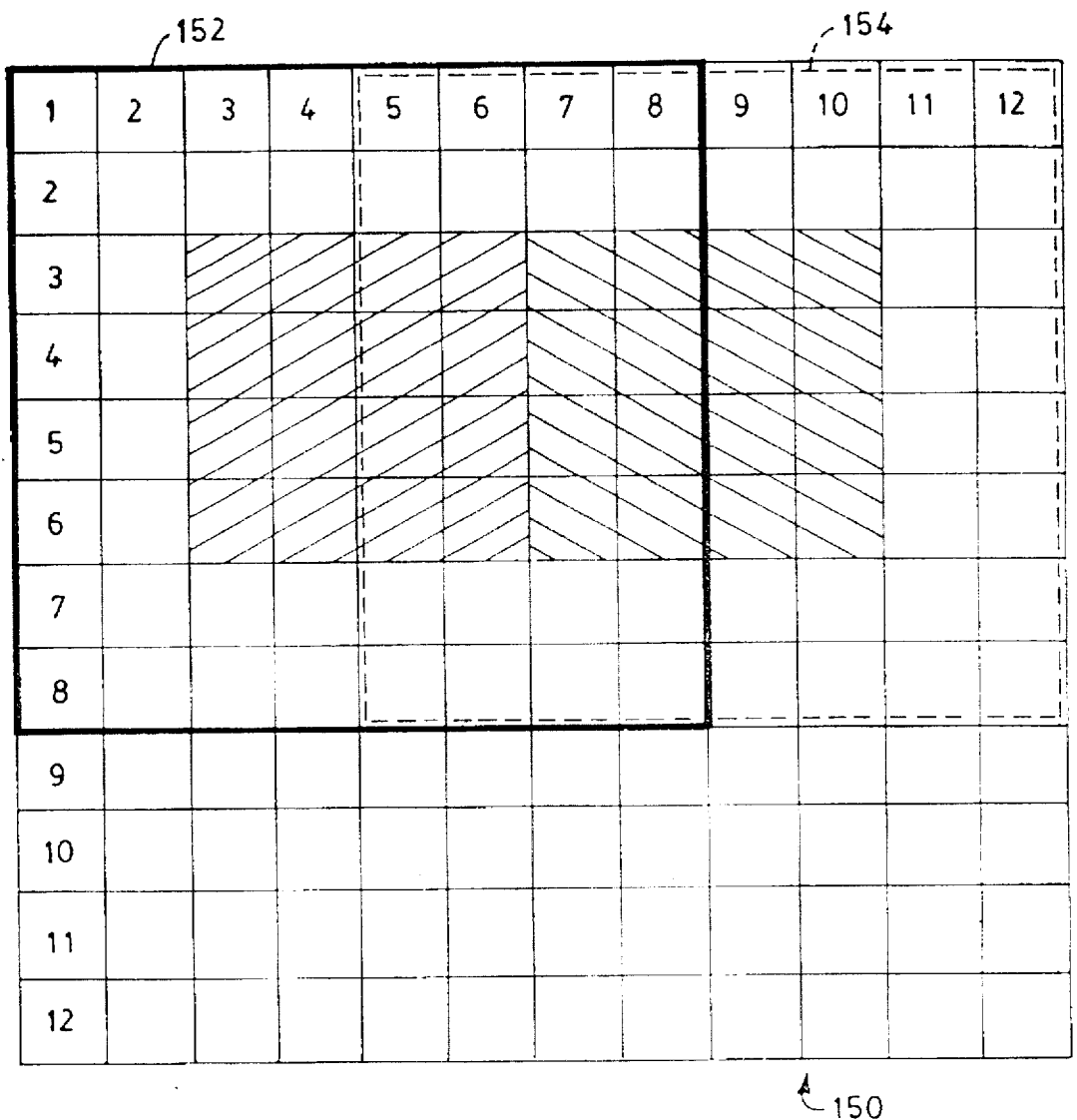
FIG. 7 illustrates overlapping between adjacent groups of pixels in an image.

FIG. 7 illustrates a preferred embodiment of the overlapping procedure where an image 150 is represented by pixels arranged in twelve rows and twelve columns. A first 8×8 pixel group 152 of 64 image data points spans rows 1–8 and columns 1–8 as designated by the dark, solid line. A second 8×8 pixel group 154 of 64 image data points spans rows 1–8 and columns 5–12 as designated by a dotted line. Each pixel group represents a two dimensional first spatial matrix s(j,i) for filtering according to the above method of FIG. 8 including overlapping. The overlap region is shown in FIG. 7 as the area including rows 1–8 and columns 5–8. Although the example of FIG. 7 shows overlapping of matrices which are horizontally adjacent in the image 150, the same method applies to matrices which are vertically adjacent in the image 150.

After the first spatial matrix s(j,i) (defined as first pixel group 152) is processed and filtered in the DCT domain, the second spatial matrix s'(j,i) of reconstructed image data points is generated by an IDCT of third intermediate matrix $I_3$ in block 140 of FIG. 6. Then, in block 142, a perimeter or border area of the second spatial matrix s'(j,i) is determined as (k−1)/2 pixels wide and the reconstructed image data points within the perimeter area are discarded. The remaining pixels constitute the saved matrix $s'_S(j,i)$ of filtered reconstructed pixels. In FIG. 7, all reconstructed image data points for block 152 located in rows and columns 1, 2, 7 and 8 are discarded, resulting in the saved matrix $s_S'(j,i)$ of reconstructed image data points located in rows 3–6, columns 3–6. For second pixel group 154, the second spatial matrix s'(j,i) of reconstructed image data points includes rows 1–8, columns 5–12. The reconstructed filtered pixels discarded in block 142 for second pixel group 154 include all reconstructed pixels in rows 1, 2, 7, 8 and columns 5, 6, 11 and 12. The saved matrix $s'_S(j,i)$ of second pixel group 154 includes reconstructed image data points located at rows 3–6, columns 7–10.

In the case where filtering the image in the frequency domain by a method similar to a mathematical convolution in the spatial domain, is combined with scaling the image, the overlap is determined by taking into consideration the kernel size k.

Figure 8:
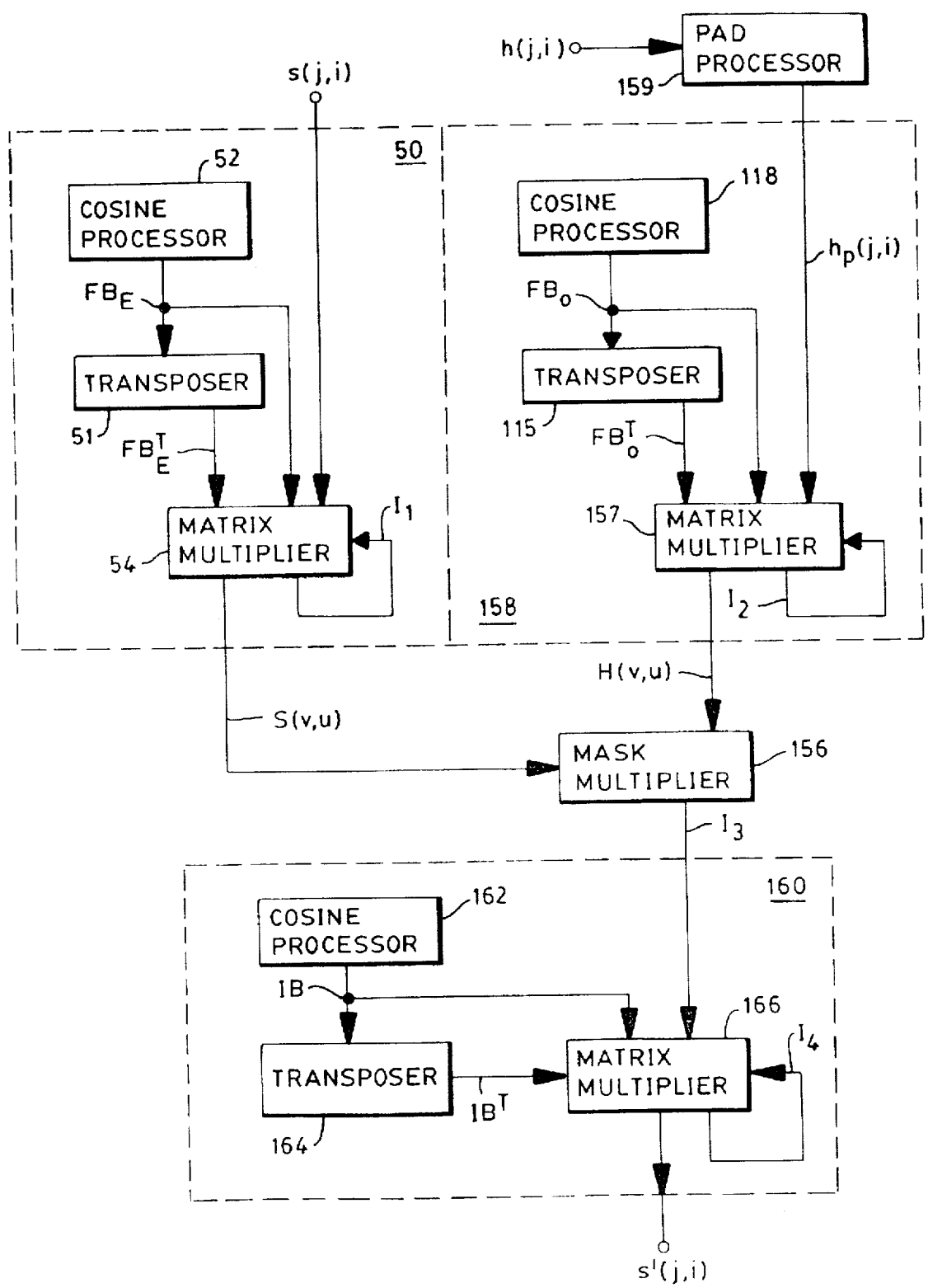
FIG. 8 is a schematic block diagram of an apparatus for filtering an image according to the method of FIG. 6.

A filtering system which operates according to the method of FIG. 6 is depicted in the schematic block diagram of FIG. 8. The system includes a forward DECT processor 50, a forward DOCT processor 158, a zero pad processor 159, a mask multiplier 156, and an IDCT processor 160. The IDCT processor 160 could readily be replaced with a hybrid IDCT processor as previously described in conjunction with FIGS. 3 and 4.

DECT processor 50 includes a cosine processor 52, a transposer 51 and a matrix multiplier 54. The first spatial matrix s(j,i) is selected as an 8×8 matrix of image data points and the forward DECT basis matrix $FB_E$ is generated in block 52 as an 8×8 matrix from the cosine terms of equation (3). The first transposed matrix $FB_E^T$ is produced as an 8×8 matrix by transposing the forward DECT basis matrix $FB_E$ in transposer 51. The first intermediate matrix $I_1$ is generated as an 8×8 matrix in matrix multiplier 54 by matrix product multiplication of the forward DECT basis matrix $FB_E$ times the first spatial matrix s(j,i). The forward DECT matrix S(v,u) is then generated in the matrix multiplier 54 as an 8×8 matrix by matrix product multiplication of the 8×8 first intermediate matrix $I_1$ times the 8×8 first transposed matrix $FB_E^T$.

DOCT processor 158 includes a cosine processor 118, a transposer 115, and a matrix multiplier 157. Since the first spatial matrix s(j,i) was selected as an 8×8 matrix of image data points in the forward DECT processor 50, forward DOCT basis matrix $FB_o$ is also generated as an 8×8 matrix in cosine processor 118 from the cosine terms of equation (9). The second transposed matrix $FB_o^T$ is produced in transposer 115 as an 8×8 matrix by transposing the forward DOCT basis matrix $FB_o$. The kernel matrix h(j,i) is input to a zero pad processor 159 which generates the 8×8 padded kernel matrix $h_p(j,i)$. Matrix multiplier 157 generates the second intermediate matrix $I_2$ as an 8×8 matrix by matrix product multiplication of the forward DOCT basis matrix $FB_o$ times the padded kernel matrix $h_p(j,i)$. The forward DOCT matrix H(v,u) is then generated as an 8×8 matrix in matrix multiplier 157 by matrix product multiplication of the second intermediate matrix $I_2$ times the second transposed matrix $FB_o^T$.

The mask multiplier 156 produces the third intermediate matrix $I_3$ as an 8×8 matrix by mask multiplication of the forward DECT matrix S(v,u) with the forward DOCT matrix H(v,u).

The IDCT processor 160 includes a cosine processor 162, a transposer 164 and a matrix multiplier 166. The cosine processor 162 generates an 8×8 IDCT basis matrix IB from the cosine terms of equation (4). A third transposed matrix $IB^T$ is produced as an 8×8 matrix in transposer 164 by transposing the IDCT basis matrix IB. A fourth intermediate matrix $I_4$ is generated in matrix multiplier 166 as an 8×8 matrix by matrix product multiplication of the IDCT basis matrix IB times the third intermediate matrix $I_3$. Finally, the second spatial matrix s'(j,i) of reconstructed image data points is generated in the matrix multiplier 166 by matrix product multiplication of the fourth intermediate matrix $I_4$ times the third transposed matrix $IB^T$. The second spatial matrix s'(j,i) can be used to print or otherwise reproduce the filtered image. However, if aliasing due to noise is a problem, then overlapping hardware (not shown) could be added to prevent aliasing by the previously discussed methods of overlapping adjacent pixel groups.

Reducing An Image By Decimation

At times it may be desirable to reduce the size of an image for printing or display applications. This can be accomplished by a method referred to as decimation, defined as reducing the image size by eliminating data points. Key features of the above resampling and filtering methods are incorporated into the method of reducing an image by decimation. In fact, reducing an image by decimation is a special case of scaling where the image is scaled down by downsampling using a scaling ratio less than one.

Typically, low pass filtering of an image is performed prior to reducing the image by decimation. The low pass filtering reduces high frequency artifacts. However, pre-decimation filtering is not necessary in the case when the spatial aliasing is inconsequential to accurate image reproduction.

Figure 9:
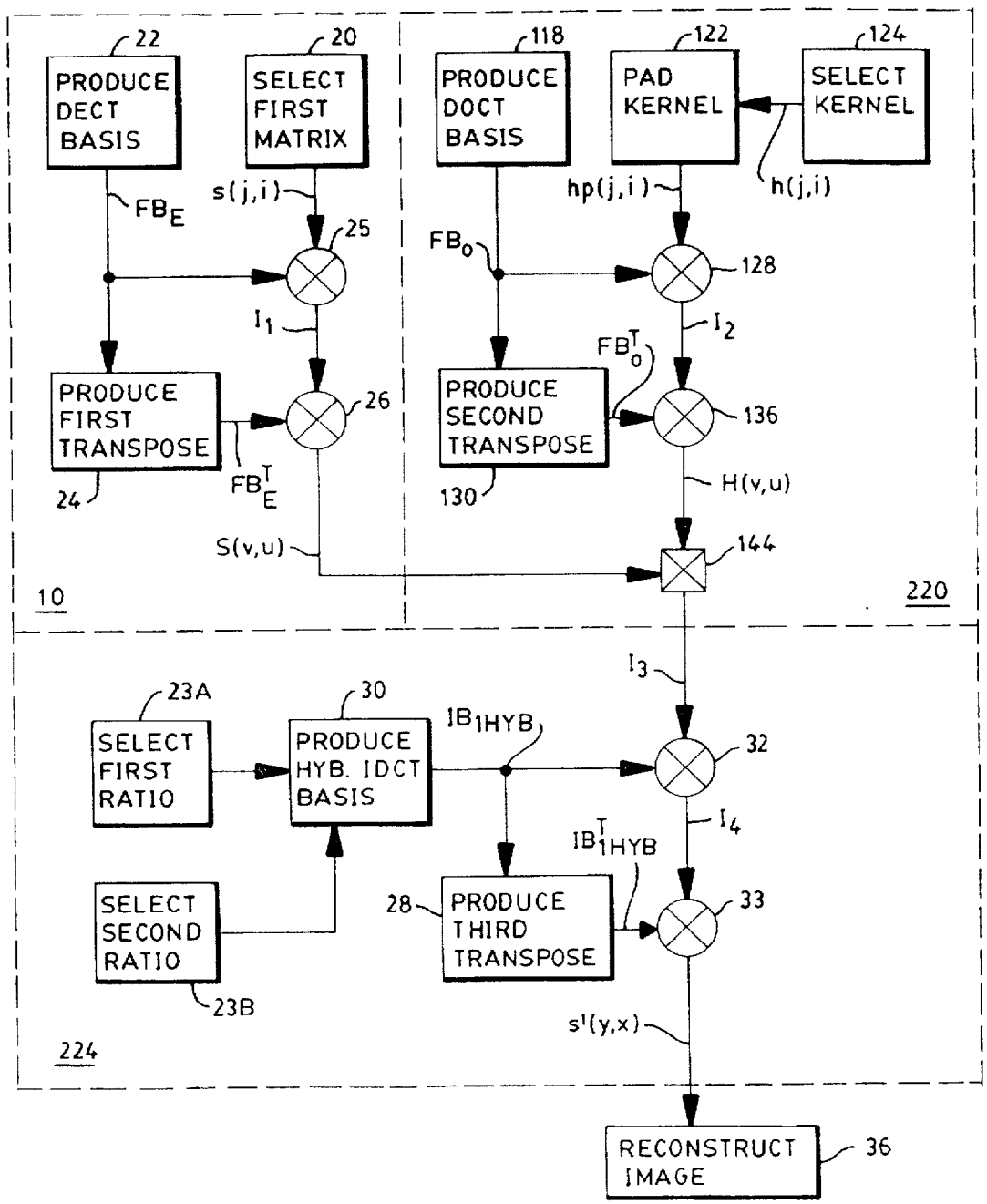
FIG. 9 is a schematic block diagram of a method for reducing an image by decimation.

The schematic block diagram of FIG. 9 shows the steps of a method for reducing an image by decimation as described in the following preferred embodiment for two dimensional image data. Repetition of some of the detailed explanations of previously described mathematics and steps will be omitted for the sake of brevity.

FIG. 9 shows a forward DECT section 10, a filtering section 220, and a decimation section 224. The forward DECT section 10 corresponds to the forward DCT section 10 of FIG. 3, the filtering section 220 includes the filtering steps of FIG. 6, and the decimation section is related to the hybrid IDCT section 12 of FIG. 3.

The two dimensional DECT matrix S(v,u), generated as described for the example of enlarging an image by interpolation in FIG. 3, is mask multiplied in the mask multiplier 144 with the forward DOCT matrix H(v,u) to generate a third intermediate matrix $I_3$ (i.e. a mask multiplied matrix) as previously described for FIG. 6. Decimation section 224 down samples the two dimensional hybrid IDCT basis matrix in either one or both dimensions so that fewer reconstructed image data points s'(y,x) will be generated than the original number of image data points s(j,i). The reduced image (not shown) is then printed, processed or otherwise reconstructed from the reconstructed image data points s'(y,x).

For the preferred embodiment of a method for reducing an image by decimation as shown in FIG. 9, the forward DECT section 10 includes the step of selecting the first spatial matrix s(j,i) as an 8×8 matrix in block 20. The 8×8 forward DECT basis matrix $FB_E$ is determined in block 22 from the cosine terms of equation (3). In multiplier 25, the 8×8 first intermediate matrix $I_1$ is generated by matrix product multiplication of the forward DCT basis matrix $FB_E$ times the first spatial matrix s(j,i). The first transpose matrix $FBE_E^T$ is generated as an 8×8 matrix in block 24 by transposing the forward DECT basis matrix $FB_E$. Multiplier 26 produces the 8×8 forward DECT matrix S(v,u) by matrix product multiplication of $I_1$ times the first transposed matrix $FBE_E^T$. For this example, the values of the first spatial matrix s(j,i), the forward DECT basis matrix $FB_E$, the first intermediate matrix $I_1$, the first transpose matrix $FB_E^T$, and the forward DECT matrix S(v,u) are the same as those listed above for the example of FIG. 3.

The filtering section 220 includes the step of selecting in block 124 a filter kernel or convolution kernel represented as h(j,i) in the spatial domain. The kernel is selected according to predetermined criteria such as a desire to sharpen or smooth the image. For our example, the following odd, symmetric 3×3 kernel h(j,i) was arbitrarily selected for low pass filtering.

| KERNEL, h(j,i) | | |
|---|---|---|
| 0.08 | 0.08 | 0.08 |
| 0.08 | 0.33 | 0.08 |
| 0.08 | 0.08 | 0.08 |

The 8×8 padded kernel matrix h(j,i) shown below is generated in block 122 to conform with the size of the 8×8 first spatial matrix chosen in block 20.

| PADDED KERNEL MATRIX, $h_P(j,i)$ | | | | | | | |
|---|---|---|---|---|---|---|---|
| 0.33 | 0.08 | 0.00 | 0.00 | 0.00 | 0.00 | 0.00 | 0.00 |
| 0.08 | 0.08 | 0.00 | 0.00 | 0.00 | 0.00 | 0.00 | 0.00 |
| 0.00 | 0.00 | 0.00 | 0.00 | 0.00 | 0.00 | 0.00 | 0.00 |
| 0.00 | 0.00 | 0.00 | 0.00 | 0.00 | 0.00 | 0.00 | 0.00 |
| 0.00 | 0.00 | 0.00 | 0.00 | 0.00 | 0.00 | 0.00 | 0.00 |
| 0.00 | 0.00 | 0.00 | 0.00 | 0.00 | 0.00 | 0.00 | 0.00 |
| 0.00 | 0.00 | 0.00 | 0.00 | 0.00 | 0.00 | 0.00 | 0.00 |
| 0.00 | 0.00 | 0.00 | 0.00 | 0.00 | 0.00 | 0.00 | 0.00 |

The following 8×8 forward DOCT basis matrix $FB_o$ of padded kernel matrix $h_P(j,i)$ is derived from the cosine terms of equation (9) as previously described in the filtering example of FIG. 6.

| FORWARD DOCT BASIS MATRIX, $FB_O$ | | | | | | | |
|---|---|---|---|---|---|---|---|
| 1.000 | 2.000 | 2.000 | 2.000 | 2.000 | 2.000 | 2.000 | 2.000 |
| 1.000 | 1.848 | 1.414 | 0.765 | −0.000 | −0.765 | −1.414 | −1.848 |
| 1.000 | 1.414 | −0.000 | −1.414 | −2.000 | −1.414 | 0.000 | 1.414 |
| 1.000 | 0.765 | −1.414 | −1.848 | 0.000 | 1.848 | 1.414 | −0.765 |
| 1.000 | −0.000 | −2.000 | 0.000 | 2.000 | −0.000 | −2.000 | 0.000 |
| 1.000 | −0.765 | −1.414 | 1.848 | −0.000 | −1.848 | 1.414 | 0.765 |
| 1.000 | −1.414 | 0.000 | 1.414 | −2.000 | 1.414 | −0.000 | −1.414 |
| 1.000 | −1.848 | 1.414 | −0.765 | 0.000 | 0.765 | −1.414 | 1.848 |

In multiplier 128, the 8×8 forward DOCT basis matrix $FB_o$ is matrix product multiplied times the 8×8 padded kernel matrix $h_p(j,i)$ to produce the 8×8 second intermediate matrix $I_2$ shown below.

| SECOND INTERMEDIATE MATRIX, $I_2$ | | | | | | | |
|---|---|---|---|---|---|---|---|
| 0.500 | 0.250 | 0.000 | 0.000 | 0.000 | 0.000 | 0.000 | 0.000 |
| 0.487 | 0.237 | 0.000 | 0.000 | 0.000 | 0.000 | 0.000 | 0.000 |
| 0.451 | 0.201 | 0.000 | 0.000 | 0.000 | 0.000 | 0.000 | 0.000 |
| 0.397 | 0.147 | 0.000 | 0.000 | 0.000 | 0.000 | 0.000 | 0.000 |
| 0.333 | 0.083 | 0.000 | 0.000 | 0.000 | 0.000 | 0.000 | 0.000 |
| 0.270 | 0.020 | 0.000 | 0.000 | 0.000 | 0.000 | 0.000 | 0.000 |
| 0.215 | −0.035 | 0.000 | 0.000 | 0.000 | 0.000 | 0.000 | 0.000 |
| 0.179 | −0.071 | 0.000 | 0.000 | 0.000 | 0.000 | 0.000 | 0.000 |

The following 8×8 second transposed matrix $FB_o^T$ is generated by transposing the 8×8 forward DOCT basis matrix $FB_o$ in block 130.

| SECOND TRANSPOSED MATRIX, $FB_O^T$ | | | | | | | |
|---|---|---|---|---|---|---|---|
| 1.000 | 1.000 | 1.000 | 1.000 | 1.000 | 1.000 | 1.000 | 1.000 |
| 2.000 | 1.848 | 1.414 | 0.765 | −0.000 | −0.765 | −1.414 | −1.848 |

| SECOND TRANSPOSED MATRIX, $FB_O{}^T$ | | | | | | | |
|---|---|---|---|---|---|---|---|
| 2.000 | 1.414 | –0.000 | –1.414 | –2.000 | –1.414 | 0.000 | 1.414 |
| 2.000 | 0.765 | –1.414 | –1.848 | 0.000 | 1.848 | 1.414 | –0.765 |
| 2.000 | –0.000 | –2.000 | 0.000 | 2.000 | –0.000 | –2.000 | 0.000 |
| 2.000 | –0.765 | –1.414 | 1.848 | –0.000 | –1.848 | 1.414 | 0.765 |
| 2.000 | –1.414 | 0.000 | 1.414 | –2.000 | 1.414 | –0.000 | –1.414 |
| 2.000 | –1.848 | 1.414 | –0.765 | 0.000 | 0.765 | –1.414 | 1.848 |

The forward DOCT matrix H(v,u) shown below is generated as an 8×8 matrix in multiplier 136 by matrix product multiplication of the 8×8 second intermediate matrix $I_2$ times the 8×8 second transposed matrix, $FB_o{}^T$.

| FORWARD DOCT MATRIX, H(v,u) | | | | | | | |
|---|---|---|---|---|---|---|---|
| 1.000 | 0.962 | 0.854 | 0.691 | 0.500 | 0.309 | 0.146 | 0.038 |
| 0.962 | 0.926 | 0.823 | 0.669 | 0.487 | 0.306 | 0.152 | 0.049 |
| 0.854 | 0.823 | 0.736 | 0.605 | 0.451 | 0.297 | 0.167 | 0.079 |
| 0.691 | 0.669 | 0.605 | 0.510 | 0.397 | 0.285 | 0.189 | 0.125 |
| 0.500 | 0.487 | 0.451 | 0.397 | 0.333 | 0.270 | 0.215 | 0.179 |
| 0.309 | 0.306 | 0.297 | 0.285 | 0.270 | 0.255 | 0.242 | 0.233 |
| 0.146 | 0.152 | 0.167 | 0.189 | 0.215 | 0.242 | 0.264 | 0.279 |
| 0.038 | 0.049 | 0.079 | 0.125 | 0.179 | 0.233 | 0.279 | 0.310 |

The following 8×8 third intermediate matrix, 13, is generated in mask multiplier 144 by mask multiplication of the 8×8 forward DECT matrix, S(v,u), with the 8×8 forward DOCT matrix, H(v,u).

| THIRD INTERMEDIATE MATRIX, $I_3$ | | | | | | | |
|---|---|---|---|---|---|---|---|
| 947.500 | 10.206 | –42.994 | 11.543 | 8.750 | 2.919 | 0.301 | –0.264 |
| –3.430 | 5.826 | –3.971 | –8.626 | –1.751 | 2.382 | –0.991 | –0.015 |
| –23.362 | 8.602 | –53.820 | –13.036 | 10.141 | –2.449 | 0.974 | –0.431 |
| –0.355 | 22.571 | 6.951 | –44.151 | –0.206 | 5.575 | –2.830 | –0.904 |
| 11.250 | –2.995 | 28.641 | 7.666 | –9.075 | 2.982 | 0.749 | –1.785 |
| –3.129 | 0.606 | –5.847 | 1.206 | –2.725 | 3.170 | –2.874 | 0.569 |
| –1.134 | 1.403 | –1.576 | –0.287 | –3.840 | 2.196 | 5.910 | –10.895 |
| 0.506 | –0.295 | 1.853 | 0.459 | 2.277 | –4.111 | 4.614 | –0.736 |

At this point, a standard inverse DCT (as in equation (4)) of the above third intermediate matrix $I_3$ would result in an 8×8 second spatial matrix s'(j,i) of reconstructed image data points. If overlapping of adjacent groups of pixels is deemed necessary to prevent aliasing (as previously discussed in accordance with the filtering examples of FIGS. 6 and 7), then the overlap for filtering with the above 3×3 kernel matrix h(j,i) would be k–1 or two pixels, amounting to a one pixel wide perimeter area (k–1)/2 of the second spatial matrix s'(j,i) to be discarded. The discarded elements of s'(j,i) would include all reconstructed image data points in rows 1, 8 and columns 1, 8. The filtered saved reconstructed matrix $s'_S(j,i)$ would be a 6×6 matrix including 36 reconstructed image data points located in rows 2–7, columns 2–7. In other words, a one pixel wide perimeter of the low pass filtered version of the second spatial matrix s'(j,i) would be discarded to prevent aliasing.

Rather than immediately performing a standard IDCT on the third intermediate matrix $I_3$ to generate a full size reconstructed filtered image as discussed above, a reduced image can be obtained when scaling down or downsampling by selecting the first dimension scaling ratio in block 23A to be less than one (i.e. 6:8 where N'=6), and selecting the second dimension scaling ratio in block 23B to be less than one (i.e. 6:8 where M'=6), wherein the first dimension scaling ratio equals the second dimension scaling ratio for the preferred embodiment. Conventionally, selection of the scaling ratios has been limited to values which reduce (or enlarge) an image without undue mathematical computation. For instance, a scaling milo of 1:2 is typical, since an 8×8 first spatial matrix s(j,i) of image data points is mathematically related to a 4×4 second spatial matrix of sixteen reconstructed image; data points by the integer multiple of two. In contrast, a scaling ratio of 2:5 would be atypical. However, according to a feature of the invention, any scaling ratio can be selected for each dimension (as previously described in the methods of FIGS. 3 and 4 for enlarging an image by interpolation). Values of reconstructed image data points of the second spatial matrix s'(y,x) which fall between the indexed locations of the image data points of the first spatial matrix s(j,i) are determined by solving s'(y,x) for values of x and y falling within the appropriate ranges for u and v in equation (6). For instance, when selecting a 2:5 resampling ratio for each dimension, the values of s'(y,x) for the first dimension interpolated to a curve (in the range of 0 to 7) are evaluated at x=2.5 and x=5 for the first group of eight pixels, as shown and earlier discussed in relation to FIG. 2C.

When choosing both the first and second dimension scaling ratios as 2:5, the following 2×8 hybrid IDCT basis matrix $IB_{1HYB}$ is generated in block 30 from the cosine terms of equation (6).

| HYBRID IDCT BASIS MATRIX, $IB_{1HYB}$ | | | | | | | |
|---|---|---|---|---|---|---|---|
| 0.354 | 0.191 | –0.354 | –0.462 | 0.000 | 0.462 | 0.354 | –0.191 |
| 0.354 | –0.278 | –0.191 | 0.490 | –0.354 | –0.098 | 0.462 | –0.416 |

A 2×8 fourth intermediate matrix 14 as shown below is generated in multiplier 32 of decimation section 224 by matrix product multiplication of the 2×8 hybrid IDCT basis $IB_{1HYB}$ matrix times the 8×8 third intermediate matrix $I_3$.

| FOURTH INTERMEDIATE MATRIX, $I_4$ | | | | | | | |
|---|---|---|---|---|---|---|---|
| 340.816 | –7.912 | –3.756 | 27.802 | –3.784 | 2.806 | 0.759 | –2.975 |
| 335.834 | 13.183 | –11.445 | –15.831 | 2.292 | 4.933 | –0.365 | –4.601 |

An 8×2 third transposed matrix $IB_{1HYB}{}^T$ (not shown) is generated in block 28 by transposing the hybrid IDCT basis matrix, $IB_{1HYB}$. Finally in multiplier 33, the following 2×2 second spatial matrix s'(j,i) of reconstructed filtered image data points is generated by matrix product multiplication of the 2×8 fourth intermediate matrix $I_4$ times the 8×2 third transposed matrix, $IB_{1HYB}{}^T$.

| SECOND SPATIAL MATRIX, s'(j,i) | |
|---|---|
| 109.601 | 139.698 |
| 135.647 | 109.952 |

In block 36, the image can be printed or otherwise reproduced using the reconstructed image data points of second spatial matrix, s'(j,i).

The ordering of steps in the above examples is not absolute or unyielding in each case. One of ordinary skill in the art could easily ascertain when the ordering of steps is critical. Also, any number of dimensions of image data points could be processed according to the teachings of the invention, i.e. the above examples using one and two dimensional image data points are exemplary rather than limiting. Additionally, the numerous features of the invention can be combined or separately applied as desired. For instance, an image represented by two dimensional image data could be scaled for reduction in one dimension and enlargement in the other dimension. Finally, the above embodiments of novel methods and devices are preferred examples of the many variations and modifications which would be apparent to one of ordinary skill in the art in keeping with the invention as claimed.

What is claimed is:

1. A method of generating a resampled image comprising the steps of:

acquiring an input signal comprising values of discrete image data points corresponding to input pixels of an input image at an initial sampling rate, said values defining at least one spatial domain matrix, each said at least one spatial domain matrix spanning over a given range;

producing a discrete even cosine transform (DECT) basis matrix corresponding to said at least one spatial domain matrix;

producing a DECT signal comprising DECT coefficients of at least one DECT matrix in response to both said DECT basis matrix and said at least one spatial domain matrix;

selecting a resampling rate to set a number of output pixels of said resampled image over said given range;

determining, for said resampling rate, an interval between said output pixels represented as $\Delta x$;

producing a hybrid inverse discrete even cosine transform (IDECT) basis matrix corresponding to said at least one DECT matrix at said resampling rate;

generating a hybrid IDECT signal comprising IDECT coefficients of at least one hybrid IDECT matrix in response to both said hybrid IDECT basis matrix and said DECT signal; and producing the resampled image from said hybrid IDECT signal.

2. The method of claim 1, wherein said hybrid IDECT is mathematically defined as:

$$s'(x) = \sqrt{\frac{2}{N}} \sum_{u=0}^{N-1} C_u S(u) \cos\frac{(2x+1)u\pi}{2N}$$

for $0 \leq x \leq (N-1)$, where:
said predetermined range is defined from 0 to (N−1);
S(u) represents said at least one DECT matrix of DECT coefficients;
s'(x) represents said hybrid IDECT matrix which represents said output image;
u is an integer variable;
x is a real number indexed according to $\Delta x$ within said predetermined range;
N is an upper integer limit of said predetermined range;

$$C_u = \frac{1}{\sqrt{2}}$$

for u=0; and
$C_u = 1$ for u≠0,
and said hybrid inverse basis matrix is generated from $$\cos\frac{(2x+1)u\pi}{2N}.$$

3. The method of claim 1, further comprising a process of generated a filtered said output image filtering the input image in a manner similar to a mathematical convolution, said process comprising the steps of:

selecting a kernel in the spatial domain, represented as a kernel matrix, according to a predetermined criterion which will facilitate one of smearing and sharpening the spatial image;

generating a padded kernel matrix having a second number of kernel coefficients in the spatial domain by padding said kernel matrix with zeros;

producing a discrete odd cosine transform (DOCT) basis matrix of DOCT basis coefficients.;

generating a DOCT matrix of DOCT coefficients by matrix product multiplication of said DOCT basis matrix times said padded kernel matrix;

generating a filtered matrix by mask multiplication of said at least one DECT matrix with said DOCT matrix; and generating said filtered output image of pixels, represented by a filtered said hybrid IDECT matrix, by performing said inverse discrete cosine transformation of said filtered matrix in accordance with said hybrid IDECT basis matrix.

4. The method of claim 3, wherein said at least one DECT matrix overlaps an adjacent said at least one DECT matrix.

5. The method of claim 4, wherein said kernel matrix comprises k elements in one dimension, and said overlapping DECT matrix overlaps by k elements, k being a preselected integer.

6. The method of claim 3, wherein said DOCT matrix is generated from the DOCT equation:

$$H(u) = 2 \sum_{i=0}^{N-1} d_i h_P(i) \cos\frac{iu\pi}{N}$$

for $0 \leq u \leq (N-1)$; where
said predetermined range is defined from 0 to (N−1);
N is an upper integer limit of said predetermined range;
i is an integer variable representing an index of said image data points;
H(u) represents said DOCT matrix of DOCT coefficients;
$h_P(i)$ represents said padded kernel matrix;
$h_P(i)=0$ for |i|>(k−1)/2;
$d_i = \frac{1}{2}$ for i=0; and
$d_i = 1$ for i=1, 2 ... (N−1).

7. The method of claim 3, wherein said predetermined criterion comprises one of smearing and sharpening the image.

8. An apparatus for resampling an input image, said apparatus comprising:

means for representing said input image as an input signal comprising at least one spatial matrix of image data points in a spatial domain, said at least one spatial domain matrix having an initial sampling rate of N samples per matrix over a range of 0≦u≦(N−1) where u and N are integers;

means for producing a discrete even cosine transform (DECT) basis matrix corresponding to said at least one spatial domain matrix;

means for generating a DECT signal comprising DECT coefficients of at least one DECT matrix of N DECT coefficients, said at least one DECT matrix corresponding to said at least one spatial domain matrix, in response to both said DECT basis matrix and said input signal;

means for selecting a resampling rate of N' where N' is an integer and N'≠N;

means for producing a hybrid inverse discrete even cosine transform (IDECT) basis matrix in accordance with said DECT signal at said resampling rate;

means for generating a hybrid IDECT signal comprising IDECT coefficients of at least one hybrid IDECT matrix in response to both said hybrid IDECT basis matrix and said DECT signal; and means for generating a resampled image response to said hybrid IDECT signal.

9. The apparatus of claim 8, wherein said means for generating the resampled matrix comprises means for solving the inverse DECT equation:

$$s'(x) = \sqrt{\frac{2}{N}} \sum_{u=0}^{N-1} C_u S(u) \cos \frac{(2x+1)u\pi}{2N}$$

for 0≦x≦(N−1), where:

S(u) represents said at least one DECT matrix of DECT coefficients;

s'(i) represents said resampled matrix of resampled image data points for the given range;

x is a real number indexed by Δx within said given range where Δx=(N−1)/(N'−1);

$$C_u = \frac{1}{\sqrt{2}}$$

for u=0; and $C_u=1$ for u≠0, and said means for generating the hybrid inverse DECT basis matrix comprises means for generating the inverse DECT basis matrix from $$\cos \frac{(2x+1)u\pi}{2N}.$$

10. The apparatus of claim 8, further comprising means for filtering the spatial image in a manner similar to a mathematical convolution, said filtering means comprising:

means for selecting a kernel in the spatial domain, represented as a kernel matrix, according to a predetermined criterion which facilitates one of smearing and sharpening of the spatial image;

means for generating a padded kernel matrix of N coefficients in the spatial domain by padding said kernel matrix with zeros;

means for producing an N element discrete odd cosine transform (DOCT) basis matrix;

means for generating a DOCT matrix of N DOCT coefficients by matrix product multiplication of said DOCT basis matrix times said padded kernel matrix;

means for generating a filtered matrix by mask multiplication of said at least one DECT matrix with said DOCT matrix; and means for generating a filtered said resampled image represented by a matrix of N' filtered and resampled image data points in the spatial domain by performing a hybrid inverse DECT of said filtered matrix in accordance with said hybrid inverse DECT basis matrix.

11. The apparatus of claim 10, further comprising means for overlapping said at least one DECT matrix with an adjacent said at least one DECT matrix.

12. The apparatus of claim 11, wherein said means for overlapping comprises means for overlapping by k elements, wherein k is a preselected integer.

13. The apparatus of claim 10, wherein said means for generating the DOCT matrix comprises means for solving the equation:

$$H(u) = 2 \sum_{i=0}^{N-1} d_i h_P(i) \cos \frac{i u \pi}{N}$$

for 0≦u≦(N−1); where

H(u) represents said DOCT matrix of DOCT coefficients;

$h_P(i)$ represents said coefficients of the padded kernel matrix;

$h_P(i)=0$ for |i|>(k−1)/2;

i is an integer index;

$d_i=½$ for i=0; and $d_i=1$ for i=1, 2 ... (N−1).

14. The apparatus of claim 10, wherein said predetermined criterion comprises one of smearing and sharpening the image.

15. A method of producing a resampled image comprising the steps of:

(a) representing an input image in a spatial domain as at least one first matrix of numerical image data points spanning a predetermined range by converting the input image into said image data points;

(b) producing at least one discrete even cosine transform (DECT) matrix of N DECT coefficients in a DECT domain, N being a predetermined integer, by a forward DECT of said at least one first matrix, said forward DECT facilitated by matrix product multiplication of a forward DECT basis matrix times said at least one first matrix;

(c) selecting a resampling ratio N':N where N' is a preselected integer and N'≠N;

(d) generating a hybrid inverse DECT basis matrix having N' elements;

(e) generating at least one second matrix of N' resampled image data points in said spatial domain by performing a hybrid inverse DECT of said at least one DECT matrix in accordance with said hybrid inverse DECT basis matrix; and producing the resampled image from said at least one second matrix of resampled image data points.

16. The method of claim 15; wherein said inverse DECT of step (d) is represented as:

$$s'(x) = \sqrt{\frac{2}{N}} \sum_{u=0}^{N-1} C_u S(u)\cos\frac{(2x+1)u\pi}{2N}$$

for $0 \leq x \leq (N-1)$, where:

said predetermined range is 0 to (N-1);

S(u) represents said at least one DECT matrix of DECT coefficients;

s'(x) represents said at least one second matrix;

u is an integer;

x is a real number:

$$C_u = \frac{1}{\sqrt{2}}$$

for u=0; and
$C_u = 1$ for $u \neq 0$,
and said hybrid inverse DECT basis matrix is generated from $$\cos\frac{(2x+1)u\pi}{2N}.$$

17. The method of claim 15, further comprising a step for generating the resampled image in the spatial domain from said second matrix.

18. The method of claim 15, further comprising a process of filtering the image represented in the spatial domain in a manner similar to a mathematical convolution, said filtering process comprising the steps of:

selecting a kernel in the spatial domain, represented as a kernel matrix, according to a predetermined criterion which facilitates one of smearing and sharpening of the spatial image;

generating a padded kernel matrix of N coefficients in the spatial domain by padding said kernel matrix with zeros;

producing an N element discrete odd cosine transform (DOCT) basis matrix;

generating a DOCT matrix of N DOCT coefficients by matrix product multiplication of said DOCT basis matrix times said padded kernel matrix;

generating a filtered matrix by mask multiplication of said at least one DECT matrix with said DOCT matrix; and generating a filtered said at least one second matrix of N' filtered and resampled image data points in the spatial domain by performing a hybrid inverse DECT of said filtered matrix in accordance with said hybrid inverse DECT basis matrix.

19. The method of claim 18, wherein said at least one first matrix overlaps an adjacent said at least one first matrix.

20. The method of claim 19, wherein said kernel matrix comprises k elements in one dimension, and said overlapping matrices overlap by k elements, k being a predefined integer.

21. The method of claim 18, wherein said DOCT matrix is generated from the DOCT equation:

$$H(u) = 2 \sum_{i=0}^{N-1} d_i h_P(i) \cos\frac{iu\pi}{N}$$

for $0 \leq u \leq (N-1)$; where

H(u) represents said DOCT matrix;

$h_P(i)$ represents said padded kernel matrix;

$h_P(i) = 0$ for $|i| > (k-1)/2$;

i and u are integers;

$d_i = \frac{1}{2}$ for i=0; and $d_i = 1$ for i=1, 2 ... (N-1).

22. The method of claim 18, wherein said predetermined criterion comprises one of smearing and sharpening the image.

23. A process of generating a filtered image, said process comprising the steps of:

providing an input signal of an input image represented in a spatial domain as at least one spatial matrix of N image data points for a predetermined range, N being a predetermined integer;

producing a discrete even cosine transform (DECT) basis matrix corresponding to said at least one spatial domain matrix;

generating a DECT signal comprising at least one DECT matrix of N DECT coefficients in response to both said DECT basis matrix and said input signal;

selecting a kernel in the spatial domain, represented as a kernel matrix, according to a predetermined criterion which facilitates one of smearing and sharpening of the input image;

generating a padded kernel signal comprising a padded kernel matrix of N coefficients in the spatial domain;

producing an N element discrete odd cosine transform (DOCT) basis matrix corresponding to said at least one spatial domain matrix;

generating a DOCT signal in response to said DOCT basis matrix and said padded kernel signal;

generating a mask signal in response to said DECT signal and said padded kernel signal;

generating a hybrid inverse discrete cosine transform (IDECT) basis matrix of N' elements where $N' \neq N$ corresponding to said at least one DECT matrix:

generating an IDECT signal comprising IDECT coefficients of at least one IDECT matrix in response to both said mask signal and said IDECT basis matrix, and generating said filtered image from an image generator in response to said IDECT signal.

24. The process of claim 23, wherein said at least one spatial matrix overlaps an adjacent said at least one spatial matrix.

25. The process of claim 24, wherein said kernel matrix comprises k elements in one dimension, and said overlapping matrices overlap by k elements, k being a preselected integer.

26. The process of claim 23, wherein said DOCT matrix is generated from the DOCT equation:

$$H(u) = 2 \sum_{i=0}^{N-1} d_i h_P(i) \cos\frac{iu\pi}{N}$$

for $0 \leq u \leq (N-1)$; where

H(u) represents said DOCT matrix of DOCT coefficients;

$h_P(i)$ represents said padded kernel matrix;

$h_P(i) = 0$ for $|i| > (N-1)/2$;

i and u are integers;

$d_i = \frac{1}{2}$ for i=0; and $d_i = 1$ for i=1, 2 ... (N-1).

27. The process of claim 23, wherein said predetermined criterion comprises one of smearing and sharpening the image.

28. The process of claim 23, wherein said filtered image is reproduced from said filtered reconstructed matrices.

29. An apparatus for resampling an input image comprised of image data points, said apparatus comprising:

a device for transmitting said input image data points at an initial sampling rate as an input signal, said input image data points defining at least one spatial domain matrix over a given range;

a resampling rate selector for selecting a resampling rate to set a number of output image data points for said given range;

a first processor for producing a discrete even cosine transform (DECT) basis matrix corresponding to said at least one spatial domain matrix;

a second processor for generating a DECT signal comprising DECT coefficients of at least one DECT matrix in response to said DECT basis matrix and said input signal;

a third processor for producing a hybrid inverse discrete even cosine transform (IDECT) basis matrix corresponding to said at least one DECT matrix at said resampling rate;

a fourth processor for generating an IDECT signal comprising IDECT coefficients of at least one IDECT matrix in response to said hybrid IDECT basis matrix and said DECT signal; and a device for transforming said IDECT signal into a resampled image.

30. A method of generating a resampled image comprising the steps of:

acquiring an input for a given range with an image acquisition device, said input signal comprising values of discrete image data points corresponding to input pixels of an input image at an initial sampling rate, said values defining at least one spatial domain matrix;

producing a discrete even cosine transform (DECT) basis matrix, corresponding to said at least one spatial domain matrix, in a processor;

producing a DECT signal in said processor, said DECT signal comprising DECT coefficients of at least one DECT matrix;

selecting a resampling ram from a selection device to set a number of output pixels of said resampled image over said given range;

determining, for said resampling rate in said processor, an interval represented as $\Delta x$ for separating said output pixels;

producing a hybrid inverse discrete even cosine transform (IDECT) basis matrix corresponding to said at least one DECT matrix at said resampling rate in said processor;

generating a hybrid IDECT signal in said processor in response to said hybrid IDECT basis matrix and said DECT signal; mad producing the resampled image with an image generator in response to said hybrid IDECT signal.

31. A process of generating a filtered image, said process comprising the steps of:

providing an input signal from an image acquisition device of an input image represented in a spatial domain as at least one spatial matrix of N image data points over a predetermined range, N being a predetermined integer;

producing a discrete even cosine transform (DECT) basis matrix corresponding to said at least one spatial domain matrix in a processor;

generating a DECT signal in said processor, said DECT signal comprising at least one DECT matrix of N DECT coefficients, in response to both said DECT basis matrix and said input signal;

selecting, from a selection device, a kernel in the spatial domain, represented as a kernel matrix, according to a predetermined criterion which facilitates one of smearing and sharpening of the input image;

generating a padded kernel signal in said processor, said padded kernel signal comprising a padded kernel matrix of N coefficients in the spatial domain;

producing, in said processor, an N element discrete odd cosine transform (DOCT) basis matrix corresponding to said at least one spatial domain matrix;

generating, in said processor, a DOCT signal in response to said DOCT basis matrix and said padded kernel signal;

generating a mask signal in said processor in response to said DECT signal and said padded kernel signal;

generating, in said processor, a hybrid inverse discrete cosine transform (IDECT) basis matrix of N' elements, where N'≠N, corresponding to said at least one DECT matrix;

generating an IDECT signal in said processor, said IDECT signal comprising IDECT coefficients of at least one IDECT matrix in response to both said mask signal and said IDECT basis matrix; and generating said filtered image from an image generator in response to said IDECT signal.

32. An apparatus for generating a filtered image comprising:

a device for acquiring an input image represented as at least one spatial domain matrix of image data points in a spatial domain;

a first processor for producing a discrete even cosine transform (DECT) basis matrix corresponding to said at least one spatial domain matrix;

a second processor for generating a DECT signal comprising at least one DECT matrix of N DECT coefficients in response to both said DECT basis matrix and said input signal;

a selection device for selecting a kernel in the spatial domain, represented as a kernel matrix, according to a predetermined criterion for facilitating one of smearing and sharpening of the input image;

a signal generator for generating a padded kernel signal comprising a padded kernel matrix of N coefficients in the spatial domain;

a third processor for producing an N element discrete odd cosine transform (DOCT) basis matrix corresponding to said at least one spatial domain matrix;

a fourth processor for generating a DOCT signal in response to said DOCT basis matrix and said padded kernel signal;

a fifth processor for generating a mask signal in response to said DECT signal and said padded kernel signal;

a sixth processor for generating a hybrid inverse discrete cosine transform (IDECT) basis matrix of N' elements, where N'≠N, corresponding to said at least one DECT matrix;

a seventh processor for generating an IDECT signal comprising IDECT coefficients of at least one IDECT matrix in response to both said mask signal and said IDECT basis matrix; and an eight processor for generating said filtered image from an image generator in response to said IDECT signal.

* * * * *